United States Patent
Fukata et al.

(10) Patent No.: US 9,604,637 B2
(45) Date of Patent: Mar. 28, 2017

(54) VEHICLE ACCELERATION SUPPRESSION DEVICE AND VEHICLE ACCELERATION SUPPRESSION METHOD

(71) Applicant: NISSAN MOTOR CO., LTD., Yokohama-shi, Kanagawa (JP)

(72) Inventors: Osamu Fukata, Sagamihara (JP); Yasuhisa Hayakawa, Yokohama (JP); Akira Morimoto, Sagamihara (JP); Daisuke Tanaka, Hadano (JP); Daisuke Oiki, Zama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/647,526

(22) PCT Filed: Nov. 22, 2013

(86) PCT No.: PCT/JP2013/006890
§ 371 (c)(1),
(2) Date: May 27, 2015

(87) PCT Pub. No.: WO2014/083830
PCT Pub. Date: Jun. 5, 2014

(65) Prior Publication Data
US 2015/0321667 A1 Nov. 12, 2015

(30) Foreign Application Priority Data
Nov. 27, 2012 (JP) .................................. 2012-259208

(51) Int. Cl.
*B60W 30/06* (2006.01)
*B60W 50/12* (2012.01)
(Continued)

(52) U.S. Cl.
CPC ............. *B60W 30/06* (2013.01); *B60K 28/00* (2013.01); *B60W 30/146* (2013.01);
(Continued)

(58) Field of Classification Search
CPC ..... B60W 30/06; B60W 40/107; B60W 50/10
See application file for complete search history.

(56) References Cited

U.S. PATENT DOCUMENTS 8,134,479 B2 * 3/2012 Suhr .................. G06K 9/00812
340/436
2005/0137766 A1 6/2005 Miyakoshi et al.
(Continued)

FOREIGN PATENT DOCUMENTS

JP 2003137001 A 5/2003
JP 2008285083 A 11/2008
(Continued)

OTHER PUBLICATIONS

Jae Kyu Suhr and Ho Gi Jung, Fully-automatic Recognition of Various Parking Slot Markings in Around View Monitor (AVM) Image Sequences, Sep. 16-19, 2012, 2012 15th International IEEE Conference on Intelligent Transportation Systems.*

*Primary Examiner* — John Q Nguyen
*Assistant Examiner* — Jordan S Fei
(74) *Attorney, Agent, or Firm* — Young Basile Hanlon & MacFarlane, P.C.

(57) ABSTRACT

A vehicle acceleration suppression device and a vehicle acceleration suppression method are provided to be capable of suppressing a degradation in a drive performance and suppressing acceleration at the time of an incorrect manipulation of an accelerator, at the time of parking. Based on a parking frame certainty degree indicative of a degree of certainty that there is a parking frame in a vehicle travel direction and a parking frame entering certainty degree
(Continued)

indicative of a degree of certainty that the vehicle enters the parking frame, a total certainty degree indicative of a total degree of certainty of the parking frame certainty degree and the parking frame entering certainty degree is set. As the total certainty degree is higher, a suppression degree of the vehicle acceleration to be controlled in response to a manipulation amount of an accelerator pedal manipulated by a driver to instruct a drive force is increased.

9 Claims, 16 Drawing Sheets

(51) Int. Cl.
  *B60W 50/10*   (2012.01)
  *B60K 28/00*   (2006.01)
  *B60W 30/14*   (2006.01)
  *B60W 40/107*   (2012.01)
  *B60K 31/00*   (2006.01)

(52) U.S. Cl.
  CPC .......... *B60W 40/107* (2013.01); *B60W 50/10* (2013.01); *B60W 50/12* (2013.01); *B60K 2031/0091* (2013.01); *B60W 2520/10* (2013.01); *B60W 2540/10* (2013.01); *B60W 2720/10* (2013.01); *B60W 2720/106* (2013.01)

(56) References Cited

U.S. PATENT DOCUMENTS

| | | | | |
|---|---|---|---|---|
| 2005/0225439 A1* | 10/2005 | Watanabe | ............ | B62D 15/027 340/435 |
| 2006/0088190 A1* | 4/2006 | Chinomi | ................... | B60R 1/00 382/104 |
| 2008/0136673 A1* | 6/2008 | Jung | ................... | B62D 15/0285 340/932.2 |
| 2009/0121899 A1* | 5/2009 | Kakinami | .......... | G06K 9/00805 340/932.2 |
| 2009/0207045 A1* | 8/2009 | Jung | ..................... | G06T 7/0044 340/932.2 |
| 2010/0023234 A1* | 1/2010 | Kameyama | ........... | B60W 30/08 701/70 |
| 2010/0049413 A1* | 2/2010 | Makino | ..................... | B60R 1/00 701/65 |
| 2010/0066825 A1* | 3/2010 | Kuboyama | ........ | G06K 9/00812 348/118 |
| 2010/0289634 A1* | 11/2010 | Ikeda | ..................... | B60Q 9/005 340/441 |
| 2012/0062394 A1* | 3/2012 | Pampus | ............... | B62D 15/027 340/932.2 |
| 2012/0197492 A1* | 8/2012 | Schneider | .......... | B62D 15/0285 701/41 |
| 2012/0316732 A1* | 12/2012 | Auer | .................. | B62D 15/0265 701/41 |
| 2014/0039728 A1 | 2/2014 | Imazu et al. | | |

FOREIGN PATENT DOCUMENTS

| | | |
|---|---|---|
| JP | 2009071659 A | 4/2009 |
| JP | 2010195118 A | 9/2010 |
| JP | 2012001081 A | 1/2012 |
| JP | 2012166705 A | 9/2012 |
| JP | 2012228119 A | 11/2012 |

* cited by examiner

FIG. 16

| ENTERING CERTAINTY DEGREE \ FRAME CERTAINTY LEVEL | LEVEL 0 | LEVEL 1 | LEVEL 2 | LEVEL 3 | LEVEL 4 |
|---|---|---|---|---|---|
| LEVEL 0 | — | — | — | — | — |
| LOW LEVEL | — | EXTREMELY LOW | LOW | LOW | LOW |
| HIGH LEVEL | — | EXTREMELY LOW | LOW | HIGH | EXTREMELY HIGH |

FIG. 17

| ACCELERATION SUPPRESSION CONDITION \ TOTAL CERTAINTY DEGREE | EXTREMELY LOW | LOW | HIGH | EXTREMELY HIGH |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MEDIUM | LARGE |
| WARNING | N | Y | Y | Y |

| ACCELERATION SUPPRESSION CONDITION / PARKING FRAME CERTAINTY DEGREE | LEVEL 1 | LEVEL 2 | LEVEL 3 | LEVEL 4 |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MIDDLE | LARGE |
| WARNING | N | Y | Y | Y | ent

VEHICLE ACCELERATION SUPPRESSION DEVICE AND VEHICLE ACCELERATION SUPPRESSION METHOD

CROSS REFERENCE TO RELATED APPLICATION

This application claims priority from Japanese Patent Application No. 2012-259208 (filed on Nov. 27, 2012), which is incorporated herein by reference in its entirety.

TECHNICAL FIELD

The present disclosure relates to a technology of suppressing acceleration of a vehicle for drive assist at the time of parking.

BACKGROUND

As a technology of controlling the speed of a vehicle such as a car, for example, there is a safety device described in JP 2003-137001 A.

In the safety device described in JP 2003-137001 A, based on geographic data of a navigation device and information indicative of a current location of the vehicle, the current location of the vehicle (i.e., car) is detected that it is deviated from a road (i.e., public road). In addition to this, when an accelerator manipulation of increasing the travel speed of the vehicle is carried out, and in addition, it is determined that the travel speed of the vehicle is faster than a predefined value, the throttle is controlled to be in a slowdown direction regardless of the driver's accelerator manipulation.

In JP 2003-137001 A, as its purpose is to prevent the acceleration of the vehicle which is not intended by the driver even if an incorrect accelerator manipulation occurs, the determination of whether or not the accelerator manipulation is incorrect is an objective. Besides, in JP 2003-137001 A, a condition where the vehicle is located at a deviated location from the road and a condition where the accelerator manipulation in a state where the travel speed equal to or faster than a predefined value is detected is carried out are considered to be a condition for determining that there is a possibility that an erroneous accelerator manipulation has occurred.

In the above-described determination condition, however, when a vehicle enters a parking space from a road, the control to be in the slowdown direction of the throttle is activated depending on the vehicle speed. Therefore, there may be a problem that the drive performance is degraded in the traveling of moving to the vicinity of a parking frame in a parking space.

SUMMARY

The present disclosure has been made in view of the above circumstances and has an object to provide a vehicle acceleration suppression device and a vehicle acceleration suppression method capable of suppressing acceleration at the time of an erroneous accelerator manipulation while suppressing a degradation in the drive performance at the time of parking.

In order to address the above issue, in one embodiment of the present disclosure, the parking frame certainty degree indicative of a degree of certainty that there is a parking frame in a travel direction of a vehicle is configured to be set for each possible parking frame based on an environment surrounding the vehicle. Then, as the parking frame certainty degree that has been set is higher, the acceleration of the vehicle, which is controlled depending on a manipulation amount of a drive force instruction manipulation element to be manipulated by a driver for instructing a drive force, is controlled at a high degree of suppression. Further, in a situation where plural possible parking frames are detected, one of the parking frame certainty degrees is corrected by another one of the parking frame certainty degrees.

According to an aspect of the present disclosure, when the parking frame certainty degree is low, the suppression degree of acceleration is lowered so that a degradation in the drive performance can be reduced, whereas when the parking frame certainty degree is high, the suppression degree of the acceleration is made higher so that an effect in the acceleration suppression can be increased.

Accordingly, it is made possible to suppress a degradation in the drive performance at the time of parking, and to suppress the acceleration at the time of an incorrect manipulation of the accelerator.

BRIEF DESCRIPTION OF THE DRAWINGS

FIG. 16 is a view illustrative of a total certainty degree set map;

FIG. 17 is a view illustrative of an acceleration suppression condition operation map;

DETAILED DESCRIPTION OF THE EMBODIMENTS

Hereinafter, embodiments of the present disclosure will be described with reference to the drawings.

First Embodiment

Hereinafter, a first embodiment (hereinafter, also referred to as the present embodiment) of the present disclosure will be described with reference to the drawings.
(Configuration)

Figure 1:
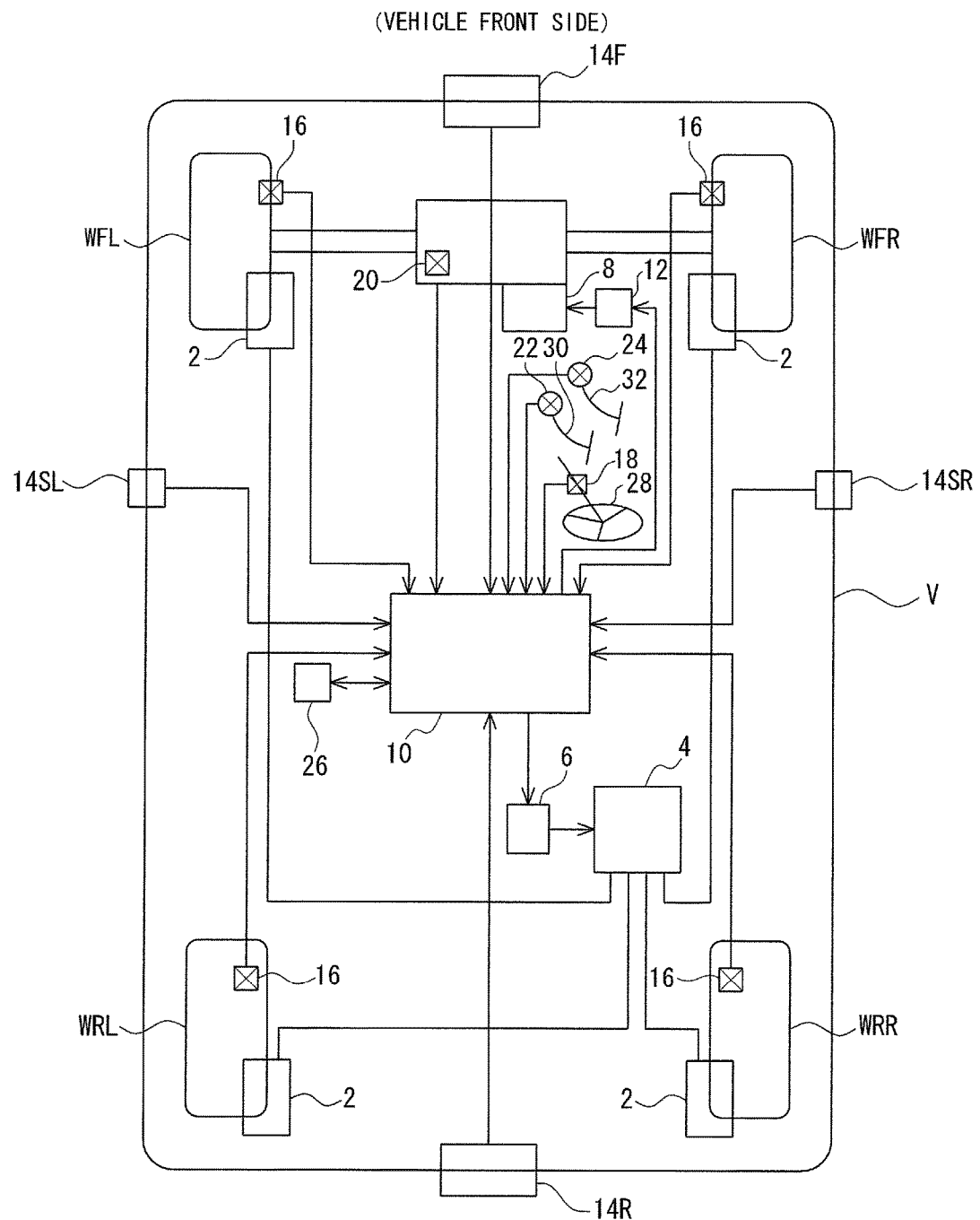
FIG. 1 is a conceptual view illustrative of a configuration of a vehicle including a vehicle acceleration suppression device in a first embodiment of the present disclosure.

Firstly, by using FIG. 1, a configuration of a vehicle including a vehicle acceleration suppression device in the present embodiment will be described. FIG. 1 is a conceptual view illustrative of the configuration of the vehicle including the vehicle acceleration suppression device in the present embodiment.

As illustrated in FIG. 1, a vehicle V includes wheels W (i.e., front right wheel WFR, front left wheel WFL, rear right wheel WRR, and rear left wheel WRL), a brake device 2, a fluid pressure circuit 4, and a brake controller 6. In addition to this, the vehicle V includes an engine 8 and an engine controller 12. For example, the brake device 2 is configured with a wheel cylinder, for example, and is provided for each wheel W.

It is to be noted that the brake device 2 is not limited to a device of applying a brake force by a fluid pressure, and may be configured with an electric brake device or the like.

The fluid pressure circuit 4 is a circuit configured to include piping connected to each brake device 2. The brake controller 6 is configured to control the brake force generated at each brake device 2 to a value corresponding to a brake force instruction value via the fluid pressure circuit 4, based on a brake force instruction value that has been received from a travel controller 10 which is a higher controller. In other words, the brake controller 6 configures a deceleration controller. It is to be noted that the travel controller 10 will be described later. Thus, the brake device 2, the fluid pressure circuit 4, and the brake controller 6 configure a brake device of generating a brake force.

The engine 8 configures a drive source of the vehicle V. The engine controller 12 controls torque (drive force) generated at the engine 8, based on a target throttle opening degree signal (acceleration instruction value) that have been received from the travel controller 10. In other words, the engine controller 12 configures an acceleration control unit. It is to be noted that the target throttle opening degree signal will be described later. Thus, the engine 8 and the engine controller 12 configure a drive unit of producing a drive force.

It is to be noted that the drive source of the vehicle V is not limited to the engine 8, and may be configured with an electric motor. Also, the drive source of the vehicle V may be configured by combining the engine 8 with an electric motor.

Figure 2:
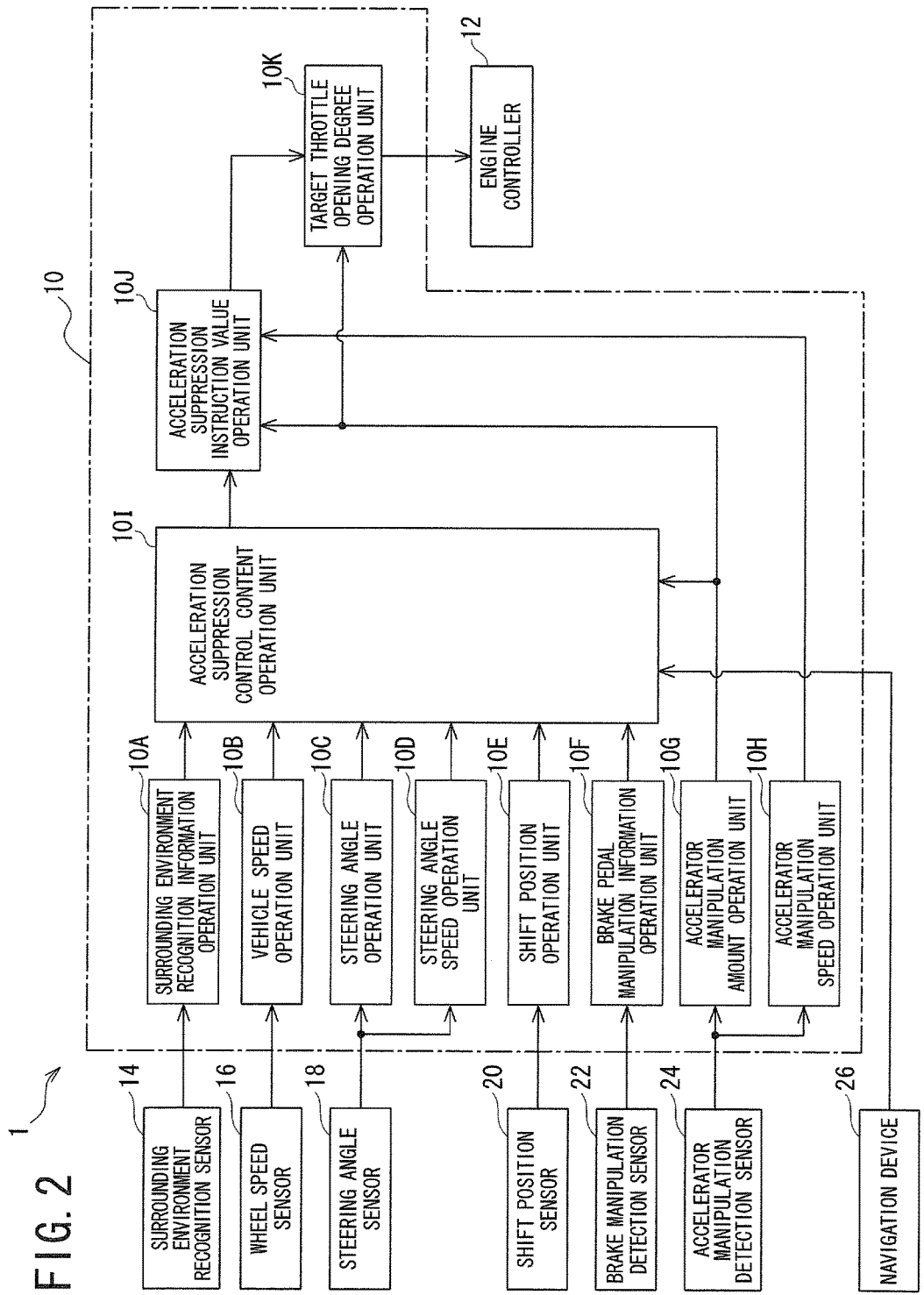
FIG. 2 is a block view illustrative of an outline configuration of the vehicle acceleration suppression device in the first embodiment of the present disclosure.

Next, referring to FIG. 1, by using FIG. 2, an outline configuration of the vehicle acceleration suppression device 1 will be described. FIG. 2 is a block view illustrative of the outline configuration of the vehicle acceleration suppression device 1 in the present embodiment.

The vehicle acceleration suppression device 1 is configured to include, as illustrated in FIG. 1 and FIG. 2, a surrounding environment recognition sensor 14, a wheel speed sensor 16, a steering angle sensor 18, a shift position sensor 20, a brake manipulation detection sensor 22, and an accelerator manipulation detection sensor 24. The vehicle acceleration suppression device 1 further includes a navigation device 26 and a travel controller 10.

The surrounding environment recognition sensor 14 is configured to capture an image of surroundings of the vehicle V, and to generate an information signal (hereinafter, also referred to as "individual image signal") including individual images corresponding to plural imaging directions based on each image that has been captured. Then, such a generated individual image signal is output to the travel controller 10.

It is to be noted that in the present embodiment, as an example, a description will be given of a case where the surrounding environment recognition sensor 14 is configured with a front camera 14F, a right side camera 14SR, a left side camera 14SL, and a rear camera 14R. Herein, the front camera 14F is a camera configured to capture a front side image of the vehicle V in front-rear direction of the vehicle V, and the right side camera 14SR is a camera configured to capture a right side image of the vehicle V. Also, the left side camera 14SL is a camera configured to capture a left side image of the vehicle V, and a rear camera 14R is a camera configured to capture a rear side image of the vehicle V in the front-rear direction of the vehicle V. The wheel speed sensor 16 is configured with a pulse generator or the like, for example, a rotary encoder of measuring a wheel speed pulse.

In addition, the wheel speed sensor 16 is configured to detect a rotation speed of each wheel W, and to output an information signal (hereinafter, also referred to as "wheel speed signal") including such a detected rotation speed to the travel controller 10. For example, the steering angle sensor 18 is arranged at a steering column (not illustrated) for rotatably supporting a steering wheel 28.

Further, the steering angle sensor 18 is configured to detect a current steering angle that is a current rotation angle (steering manipulation amount) of the steering wheel 28 that is a steering manipulation element. Then, the information signal (hereinafter, also referred to as "current steering angle signal") including the detected current steering angle is output to the travel controller 10. It is to be noted that the information signal including the turning angle of a turning wheel may be detected as information indicative of a steering angle.

It is to be noted that the steering manipulation element is not limited to the steering wheel 28 to be steered by a driver. For example, it may be a lever manipulated by a driver's hand. In this case, the angle of inclination of the lever from a neutral position is output as the information signal corresponding to the current steering angle signal.

The shift position sensor 20 is configured to detect a current position of a member, such as a shift knob, a shift lever, or the like, for changing the shift position (for example, "P", "D", "R" or the like) of the vehicle V. Then, the information signal (hereinafter, also referred to as "shift position signal") including the detected current position is output to the travel controller 10.

The brake manipulation detection sensor 22 is configured to detect an opening degree of a brake pedal 30, which is a brake force instruction manipulation element. Then, the information signal (hereinafter, also referred to as "brake opening degree signal") including the opening degree of the brake pedal 30 that has been detected is output to the travel controller 10.

Herein, the brake force instruction manipulation element can be manipulated by a driver of the vehicle V, and is a configuration to instruct a brake force of the vehicle V by a change in the opening degree. It is to be noted that the brake force instruction manipulation element is not limited to the brake pedal 30 to be pressed for manipulation by a driver with a foot. For example, it may be a lever manipulated by a driver's hand.

The accelerator manipulation detection sensor 24 is configured to detect the opening degree of an accelerator pedal 32, which is a drive force instruction manipulation element. Then, the information signal (hereinafter, also referred to as "accelerator opening degree signal") including the detected opening degree of the accelerator pedal 32 is output to the travel controller 10.

Herein, the drive force instruction manipulation element can be manipulated by a driver of the vehicle V, and is a configuration indicative of a drive force of the vehicle V by a change in the opening degree. It is to be noted that the drive force instruction manipulation element is not limited to the accelerator pedal 32 to be pressed for manipulation by a driver with a foot. For example, it may be a lever manipulated by a driver's hand.

The navigation device 26 includes a GPS (Global Positioning System) receiver, a map database, and an information presentation device including a display monitor and the like, and is a device configured to perform a route search, a route guidance, and the like.

In addition, the navigation device 26 is capable of acquiring road information such as a type of a road, a width of the road, and the like of the road on which the vehicle V travels, based on the current location of the vehicle V acquired by using the GPS receiver and the road information stored in the map database.

Further, the navigation device 26 is configured to output the information signal (hereinafter, also referred to as "vehicle location signal") including the current location of the vehicle V acquired by using the GPS receiver to the travel controller 10. In addition to this, the navigation device 26 is configured to output the information signal (hereinafter, also referred to as "travel road information signal") including the type of the road, the width of the road, and the like of the road on which the vehicle V travels to the travel controller 10.

The information presentation device is configured to output a warning or another presentation in a sound or image in response to a control signal from the travel controller 10. In addition, the information presentation device is configured to include for example, a speaker to provide information to a driver in a buzzer or voice, and a display unit to provide information by presenting an image or text. Further, for example, a display monitor of the navigation device 26 may be used for the display unit.

The travel controller 10 is an electronic control unit configured with a CPU (Central Processing Unit), and CPU peripheral devices such as a ROM (Read Only Memory), a RAM (Random Access Memory), and the like.

In addition, the travel controller 10 includes a parking drive assist unit configured to carry out a drive assist process for parking.

The parking drive assist unit of the process of the travel controller 10 is configured to functionally include, as illustrated in FIG. 2, processes of a surrounding environment recognition information operation unit 10A, a vehicle speed operation unit 10B, a steering angle operation unit 10C, and a steering angle speed operation unit 10D. In addition, the parking drive assist unit is configured to functionally include processes of a shift position operation unit 10E, a brake pedal manipulation information operation unit 10F, an accelerator manipulation amount operation unit 10G, an accelerator manipulation speed operation unit 10H, and an acceleration suppression control content operation unit 10I. Further, the parking drive assist unit is configured to functionally include processes of an acceleration suppression instruction value operation unit 10J, and a target throttle opening degree operation unit 10K. These functions are configured with one or more programs.

The surrounding environment recognition information operation unit 10A is configured to create an image (bird's-eye view image) of surroundings of the vehicle V viewed from above the vehicle V based on the individual image signal which has been received from the surrounding environment recognition sensor 14. Then, information signal (hereinafter, also referred to as "bird's-eye view image signal") including the bird's-eye view image that has been created is output to the acceleration suppression control content operation unit 10I.

Herein, the bird's-eye view image, for example, is created by synthesizing the images captured by the respective cameras (the front camera 14F, the right side camera 14SR, the left side camera 14SL, and the rear camera 14R). In addition, a bird's-eye view image includes, for example, an image indicative of a road marking such as a line (hereinafter, also referred to as "parking frame line") of a parking frame displayed on a road surface.

The vehicle speed operation unit 10B is configured to operate the speed (vehicle speed) of the vehicle V from the rotation speed of the wheel W based on the wheel speed signal which has been received from the wheel speed sensor 16. Then, an information signal (hereinafter, also referred to as "vehicle speed operation value signal") including the speed that has been operated is output to the acceleration suppression control content operation unit 10I.

The steering angle operation unit 10C is configured to operate the manipulation amount (rotation angle) from the neutral position of the steering wheel 28 based on the current steering angle signal which has been received from the steering angle sensor 18 from the current rotation angle of the steering wheel 28. Then, an information signal (hereinafter, also referred to as "steering angle signal") including the manipulation amount from the neutral position which has been operated is output to the acceleration suppression control content operation unit 10I.

The steering angle speed operation unit 10D is configured to carry out a differential process on the current steering angle included in the steering angle signal that has been received from the steering angle sensor 18, and to operate the steering angle speed of the steering wheel 28. Then, an information signal (hereinafter, also referred to as "steering angle speed signal") including the steering angle speed that has been operated is output to the acceleration suppression control content operation unit 10I.

The shift position operation unit 10E is configured to determine the current shift position based on the shift position signal that has been received from the shift position sensor 20. Then, an information signal (hereinafter, also referred to as "current shift position signal") including the current shift position that has been operated is output to the acceleration suppression control content operation unit 10I.

The brake pedal manipulation information operation unit 10F is configured to operate the pressed amount of the brake pedal 30 with a pressed amount "0" being used as a reference, based on the brake opening degree signal which has been received from the brake manipulation detection sensor 22. Then, an information signal (hereinafter, also referred to as "brake side pressed amount signal") including the pressed amount of the brake pedal 30 that has been operated is output to the acceleration suppression control content operation unit 10I.

The accelerator manipulation amount operation unit 10G is configured to operate the pressed amount of the accelerator pedal 32 with a pressed amount "0" being used as a reference, based on the accelerator opening degree signal which has been received from the accelerator manipulation detection sensor 24. Then, an information signal (hereinafter, also referred to as "drive side pressed amount signal") including the pressed amount of the accelerator pedal 32 that has been operated is output to the acceleration suppression control content operation unit 10I, the acceleration suppression instruction value operation unit 10J, and the target throttle opening degree operation unit 10K.

The accelerator manipulation speed operation unit 10H is configured to operate the manipulation speed of the accelerator pedal 32, by carrying out the differential process on the opening degree of the accelerator pedal 32 included in the accelerator opening degree signal which has been received from the accelerator manipulation detection sensor 24. Then, an information signal (hereinafter, also referred to as "accelerator manipulation speed signal") including the manipulation speed of the accelerator pedal 32 that has been operated is output to the acceleration suppression instruction value operation unit 10J.

The acceleration suppression control content operation unit 10I is configured to receive above-described various information signals (including an bird's-eye view image signal, a vehicle speed operation value signal, a steering angle signal, a steering angle speed signal, a current shift position signal, a brake side pressed amount signal, a drive side pressed amount signal, a vehicle location signal, and a travel road information signal). Then, the acceleration suppression control content operation unit 10I is configured to operate an acceleration suppression activation condition determination result, an acceleration suppression control start timing, and an acceleration suppression control amount, as will be described later, based on the various information signals that have been received. Further, the acceleration suppression control content operation unit 10I is configured to output the information signal including such operated parameters to the acceleration suppression instruction value operation unit 10J.

It is to be noted that a detailed configuration of the acceleration suppression control content operation unit 10I and the process to be carried out by the acceleration suppression control content operation unit 10I will be described later.

The acceleration suppression instruction value operation unit 10J is configured to receive inputs of the above-described drive side pressed amount signal and the accelerator manipulation speed signal, and inputs of an acceleration suppression activation condition determination result signal, an acceleration suppression control start timing signal, and an acceleration suppression control amount signal, as will be described later. Then, the acceleration suppression instruction value operation unit 10J is configured to operate the acceleration suppression instruction value that is an instruction value for suppressing the acceleration instruction value which depends on the pressed amount (drive force manipulation amount) of the accelerator pedal 32. Further, the acceleration suppression instruction value operation unit 10J is configured to output an information signal (hereinafter, also referred to as "acceleration suppression instruction value signal") including the acceleration suppression instruction value that has been operated to the target throttle opening degree operation unit 10K.

In addition, the acceleration suppression instruction value operation unit 10J is configured to operate an ordinary acceleration instruction value that is an instruction value for use in ordinary acceleration control depending on the acceleration suppression activation condition determination result signal that has been received. Further, the acceleration suppression instruction value operation unit 10J is configured to output an information signal (hereinafter, also referred to as "ordinary acceleration instruction value signal") including the ordinary acceleration instruction value that has been operated to the target throttle opening degree operation unit 10K. It is to be noted that the process to be carried out by the acceleration suppression instruction value operation unit 10J will be described later.

The target throttle opening degree operation unit 10K is configured to receive inputs of the drive side pressed amount signal, and the acceleration suppression instruction value signal or the ordinary suppression instruction value signal. Then, the target throttle opening degree operation unit 10K is configured to operate the target throttle opening degree that is the throttle opening degree depending on the pressed amount of the accelerator pedal 32 or the ordinary acceleration instruction value, based on the pressed amount of the accelerator pedal 32, and the acceleration suppression instruction value or the ordinary acceleration suppression instruction value. Further, the target throttle opening degree operation unit 10K is configured to output an information signal (hereinafter, also referred to as "target throttle opening degree signal") including the target throttle opening degree that has been operated to the engine controller 12.

In addition, the target throttle opening degree operation unit 10K is configured to output the target throttle opening degree signal to the engine controller 12 based on an acceleration suppression control start timing, to be described below, in a case where the acceleration suppression instruction value includes the acceleration suppression control start timing instruction value.

It is to be noted that the process to be carried out by the target throttle opening degree operation unit 10K will be described later.

(Configuration of Acceleration Suppression Control Content Operation Unit 10I)

Figure 3:
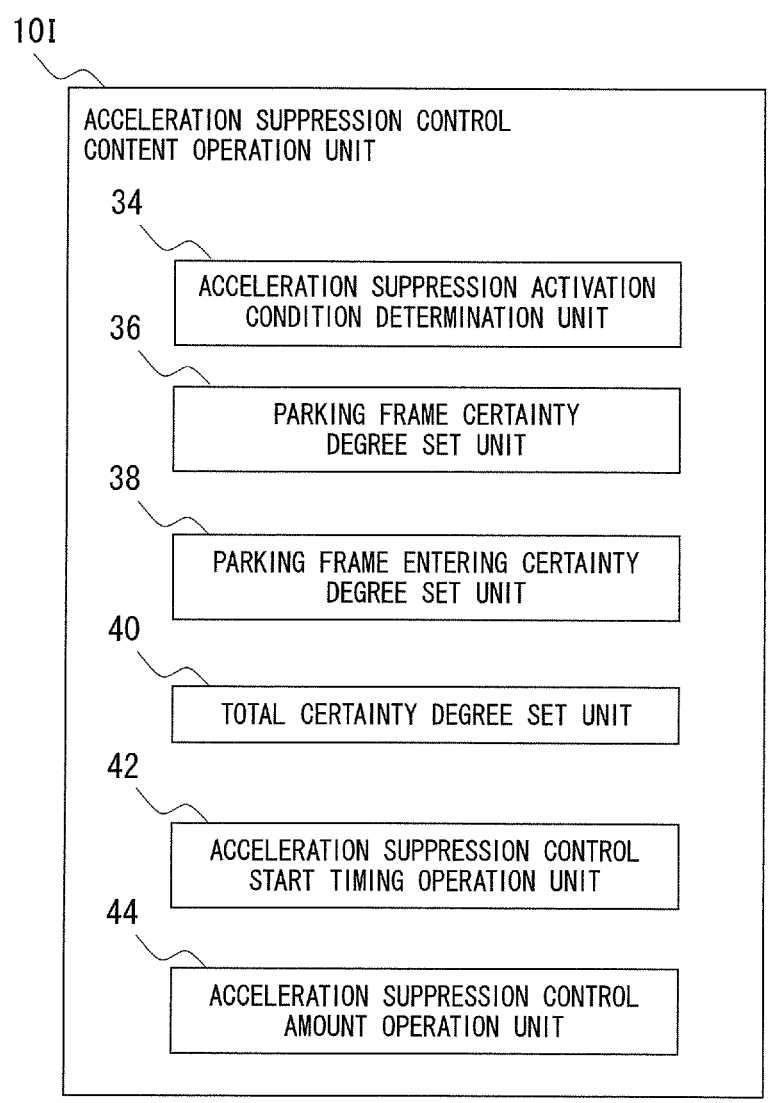
FIG. 3 is a block view illustrative of a configuration of an acceleration suppression control content operation unit.
Figure 4:
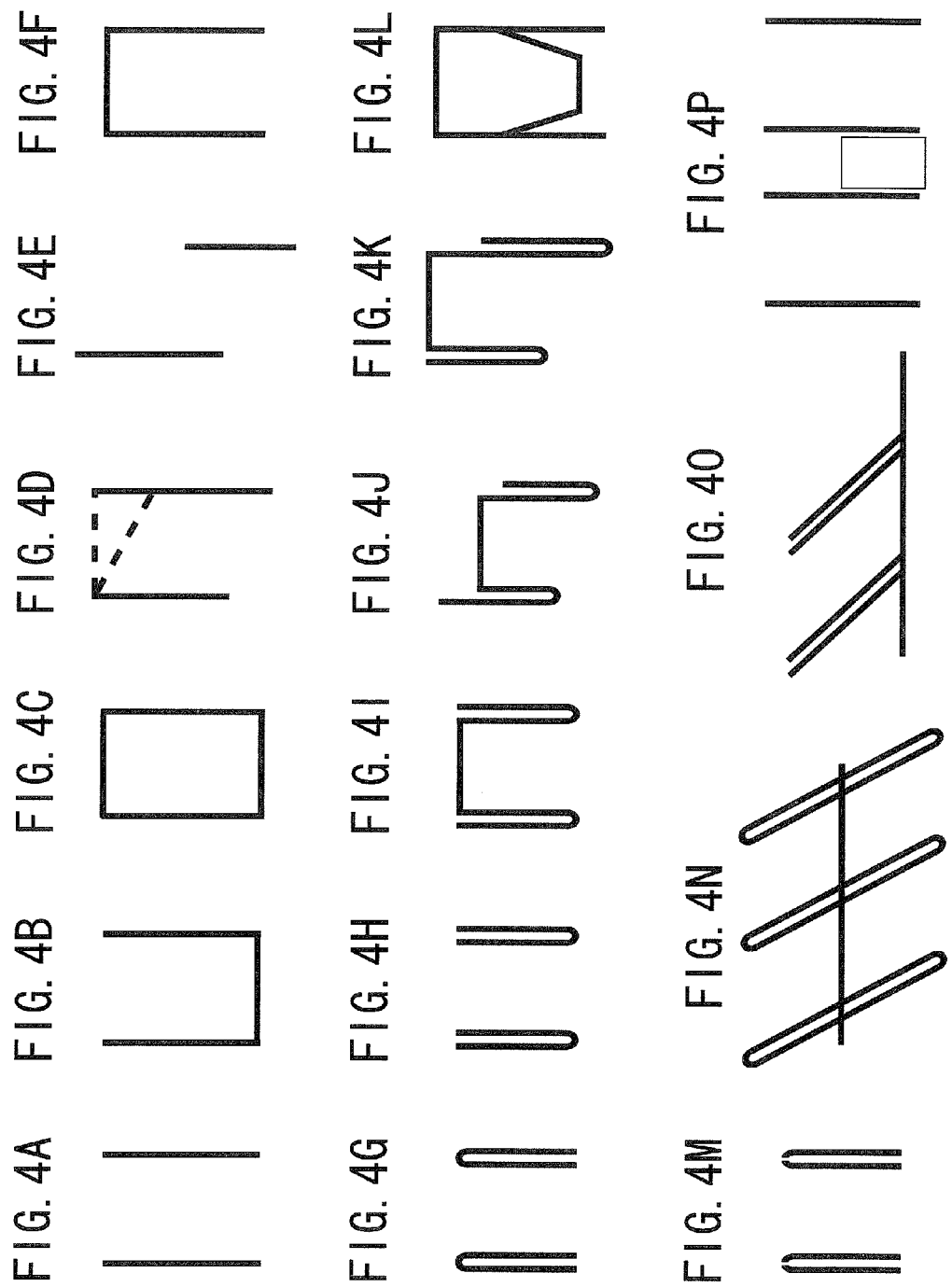
FIG. 4A to FIG. 4P are views illustrative of parking frame patterns that is a setting target of a parking frame certainty degree by a parking frame certainty degree set unit.

Next, referring to FIG. 1 and FIG. 2, by using FIG. 3 and FIG. 4A to FIG. 4P, a detailed configuration of the acceleration suppression control content operation unit 10I will be described. FIG. 3 is a block view illustrative of a configuration of the acceleration suppression control content operation unit 10I.

As illustrated in FIG. 3, the acceleration suppression control content operation unit 10I is configured to include an acceleration suppression activation condition determination unit 34, a parking frame certainty degree set unit 36, a parking frame entering certainty degree set unit 38, and a total certainty degree set unit 40. In addition, the acceleration suppression control content operation unit 10I includes an acceleration suppression control start timing operation unit 42, and an acceleration suppression control amount operation unit 44.

The acceleration suppression activation condition determination unit 34 is configured to determine whether or not a condition to activate acceleration suppression control is satisfied, and to output an information signal (hereinafter, also referred to as "acceleration suppression activation condition determination result signal") including the determination result to the acceleration suppression instruction value operation unit 10J. Herein, the acceleration suppression control is control to suppress an acceleration instruction value for accelerating the vehicle V depending on the pressed amount of the accelerator pedal 32.

It is to be noted that a description will be given later of the process of determining whether or not the condition that the acceleration suppression activation condition determination unit 34 activates the acceleration suppression control is satisfied.

The parking frame certainty degree set unit 36 is configured to set a parking frame certainty degree indicative of a degree of certainty about the existence of a parking frame in a travel direction of the vehicle V. Then, the parking frame certainty degree set unit 36 is configured to output an information signal (hereinafter, also referred to as "parking frame certainty degree signal") including the parking frame certainty degree that has been set to the total certainty degree set unit 40.

Herein, the parking frame certainty degree set unit 36 is configured to set the parking frame certainty degree by referring to various types of information included in the bird's-eye view image signal, the vehicle speed operation value signal, the current shift position signal, the vehicle location signal, and the travel road information signal.

In addition, the parking frame which is a setting target of the parking frame certainty degree set unit 36 includes plural patterns, for example, as illustrated in FIG. 4A to FIG. 4P. It is to be noted that FIG. 4A to FIG. 4P are views illustrative of patterns of the parking frame, which is the setting target of the parking frame certainty degree set unit 36.

Herein, the parking frame certainty degree set unit 36 is configured to carry out the process of determining whether or not there is a single parking frame basically. However, it is also possible to detect plural parking frames at the same time. In a parking space of a large-sized store, it is more common that plural parking frames are arranged in a regularly aligned manner. Then, when the parking frame certainty degree set unit 36 recognizes plural possible parking frames at the same time, the parking frame certainty degree set unit 36 is configured to set a parking frame certainty degree for each possible parking frame.

It is to be noted that a description will be given later of the process of setting the parking frame certainty degree by the parking frame certainty degree set unit 36.

The parking frame entering certainty degree set unit 38 is configured to set a parking frame entering certainty degree indicative of the degree of certainty that the vehicle V enters a parking frame. Then, the parking frame entering certainty degree set unit 38 is configured to output an information signal (hereinafter, also referred to as "parking frame entering certainty degree signal") including the parking frame entering certainty degree which has been set to the total certainty degree set unit 40.

Herein, the parking frame entering certainty degree set unit 38 is configured to set the parking frame entering certainty degree by referring to various types of information included in the bird's-eye view image signal, the vehicle speed operation value signal, the current shift position signal, and the steering angle signal.

In addition, like the parking frame certainty degree set unit 36, the parking frame entering certainty degree set unit 38 is configured to set the parking frame entering certainty degree for each of plural parking frames at the same time. It is to be noted that the process of setting the parking frame entering certainty degree by the parking frame entering certainty degree set unit 38 will be described later.

The total certainty degree set unit 40 is configured to receive inputs of the parking frame certainty degree signal the parking frame entering certainty degree signal, and to set a total certainty degree indicative of a total certainty degree of the parking frame certainty degree and the parking frame entering certainty degree. Then, the total certainty degree set unit 40 is configured to output an information signal (hereinafter, also referred to as "total certainty degree signal") including the total certainty degree which has been set to the acceleration suppression control start timing operation unit 42 and the acceleration suppression control amount operation unit 44. It is to be noted that the process of setting the total certainty degree by the total certainty degree set unit 40 will be described later.

The acceleration suppression control start timing operation unit 42 is configured to operate the acceleration suppression control start timing that is a timing to start the acceleration suppression control. Then, the acceleration suppression control start timing operation unit 42 is configured to output an information signal (hereinafter, also referred to as "acceleration suppression control start timing signal") including the acceleration suppression control start timing that has been operated to the acceleration suppression instruction value operation unit 10J.

Herein, the acceleration suppression control start timing operation unit 42 is configured to operate the acceleration suppression control start timing by referring to various types of information included in the total certainty degree signal, the brake side pressed amount signal, the vehicle speed operation value signal, the current shift position signal, and the steering angle signal. It is to be noted that process of operating the acceleration suppression control start timing by the acceleration suppression control start timing operation unit 42 will be described later.

The acceleration suppression control amount operation unit 44 is configured to operate the acceleration suppression control amount that is a control amount to suppress the acceleration instruction value which depends on the pressed amount of the accelerator pedal 32. Then, the acceleration suppression control amount operation unit 44 is configured to output an information signal (hereinafter, also referred to as "acceleration suppression control amount signal") including the acceleration suppression control amount that has been operated to the acceleration suppression instruction value operation unit 10J.

Herein, the acceleration suppression control amount operation unit 44 is configured to operate the acceleration suppression control amount by referring to various types of information included in the total certainty degree signal, the brake side pressed amount signal, the vehicle speed operation value signal, the current shift position signal, and the steering angle signal. It is to be noted the process of operating the acceleration suppression control amount by the acceleration suppression control amount operation unit 44 will be described later.

(Process to be Carried Out by the Acceleration Suppression Control Content Operation Unit 10I)

Next, referring to FIG. 1 to FIG. 4P, by using FIG. 5 to FIG. 13, the process to be carried out by the acceleration suppression control content operation unit 10I will be described.

Referring to FIG. 1 to FIG. 4P, by using FIG. 5 and FIG. 6, a process of determining whether or not a condition (hereinafter, also referred to as "acceleration suppression activation condition") that the acceleration suppression activation condition determination unit 34 activates the acceleration suppression control will be described.

Figure 5:
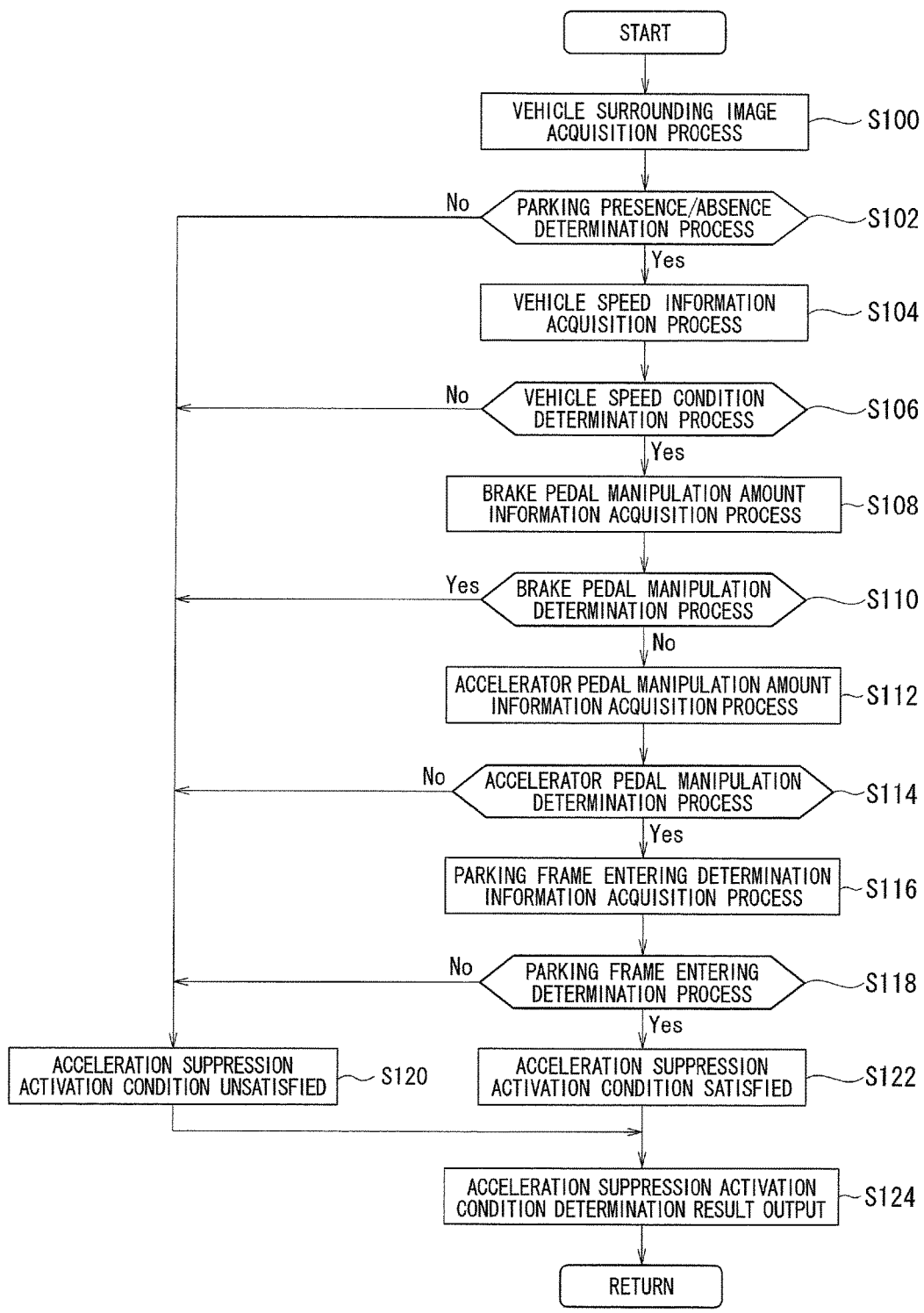
FIG. 5 is a flow chart illustrative of a process of determining whether or not an acceleration suppression activation condition is satisfied by an acceleration suppression activation condition determination unit.

FIG. 5 is a flow chart illustrative of the process of determining whether or not the acceleration suppression activation condition is satisfied, by the acceleration suppression activation condition determination unit 34. It is to be noted that the acceleration suppression activation condition determination unit 34 is configured to carry out the process to be described below at every predefined sampling time (for example, 10 msec).

As illustrated in FIG. 5, when the acceleration suppression activation condition determination unit 34 starts (START), firstly, in step S100, a process ("vehicle surrounding image acquisition process" in the drawing) of acquiring an image of surroundings of the vehicle V. When the process of acquiring an image of surroundings of the vehicle V is carried out in step S100, the process to be carried out by the acceleration suppression activation condition determination unit 34 goes to step S102. It is to be noted that the image of surroundings of the vehicle V is acquired by referring to the bird's-eye view image of surroundings of the vehicle V included in the bird's-eye view image signal which has been received from the surrounding environment recognition information operation unit 10A.

In step S102, based on the image acquired in step S100, a process ("parking presence/absence determination process" in the drawing) of determining the presence or absence of the parking frame is carried out.

Herein, the process of determining the presence or absence of the parking frame is carried out by determining whether or not a white line (parking frame line) of defining the parking frame is present, for example, within a predefined distance or region (area) with the vehicle V being used as a reference. In addition, for the process of recognizing a parking frame line from the image acquired in step S100, various types of publicly known methods, for example, a banalization process and the like are used.

It is to be noted that for the process of determining the presence/absence of the parking frame, the process of setting the parking frame certainty degree by the parking frame certainty degree set unit 36 may be used. When the presence of the parking frame is determined ("Yes" in the drawing) in step S102, the process to be carried out by the acceleration suppression activation condition determination unit 34 goes to step S104.

On the other hand, when the absence of the parking frame is determined ("No" in the drawing) in step S102, the process to be carried out by the acceleration suppression activation condition determination unit 34 goes to step S120.

In step S104, by referring to the vehicle speed operation value signal that has been received from the vehicle speed operation unit 10B, the process of acquiring the speed of the vehicle V ("vehicle speed information acquisition process" in the drawing) is carried out. When the process of acquiring the speed of the vehicle V is carried out in step S104, the process to be carried out by the acceleration suppression activation condition determination unit 34 goes to step S106.

In step S106, based on the vehicle speed acquired in step S104, a process ("vehicle speed condition determination process" in the drawing) of determining whether or not the condition that the speed of the vehicle V is lower than a predefined threshold vehicle speed is satisfied.

It is to be noted that in the present embodiment, a case where the threshold vehicle speed is set to 15 km/h, as an example, will be described. In addition, the threshold vehicle speed is not limited to 15 km/h. For example, it may be changed depending on data of the vehicle V, such as a brake performance of the vehicle V or the like. In addition, for example, it may be changed depending on the local (national) traffic regulation where the vehicle V travels.

When it is determined that the condition that the speed of the vehicle V is lower than the threshold vehicle speed is satisfied ("Yes" in the drawing) in step S106, the process to be carried out by the acceleration suppression activation condition determination unit 34 goes to step S108.

On the other hand, it is determined that the condition that the speed of the vehicle V is lower than the threshold vehicle speed is not satisfied ("No" in the drawing) in step S106, the process to be carried out by the acceleration suppression activation condition determination unit 34 goes to step S120.

In step S108, by referring to the brake side pressed amount signal that has been received from the brake pedal manipulation information operation unit 10F, a process of acquiring information about the pressed amount (manipulation amount) of the brake pedal 30 ("brake pedal manipulation amount information acquisition process" in the drawing) is carried out. When the process of acquiring the information about the pressed amount (manipulation amount) of the brake pedal 30 is carried out in step S108, the process to be carried out by the acceleration suppression activation condition determination unit 34 goes to step S110.

In step S110, based on the pressed amount of the brake pedal 30 acquired in step S108, a process ("brake pedal manipulation determination process" in the drawing) of determining whether or not the brake pedal 30 is manipulated is carried out.

When it is determined that the brake pedal 30 is not manipulated ("No" in the drawing) in step S110, the process to be carried out by the acceleration suppression activation condition determination unit 34 goes to step S112.

On the other hand, when it is determined that the brake pedal 30 is manipulated ("Yes" in the drawing) in step S110, the process to be carried out by the acceleration suppression activation condition determination unit 34 goes to step S120.

In step S112, by referring to the drive side pressed amount signal that has been received from the accelerator manipulation amount operation unit 10G, a process ("accelerator pedal manipulation amount information acquisition process" in the drawing) of acquiring the information about the pressed amount (manipulation amount) of the accelerator pedal 32 is carried out. When the process of acquiring the information about the pressed amount (manipulation amount) of the accelerator pedal 32 is carried out in step S112, the process to be carried out by the acceleration suppression activation condition determination unit 34 goes to step S114.

In step S114, a process ("accelerator pedal manipulation determination process" in the drawing) of determining whether or not the condition that the pressed amount (manipulation amount) of the accelerator pedal 32 is equal to or larger than a predefined threshold accelerator manipulation amount is satisfied is carried out. Herein, the process of step S114 is carried out based on the pressed amount of the accelerator pedal 32 acquired in step S112.

It is to be noted that in the present embodiment, a case where the threshold accelerator manipulation amount is set to a manipulation amount corresponding to 3% of the opening degree of the accelerator pedal 32 will be described as an example. In addition, the threshold accelerator manipulation amount is not limited to the manipulation amount corresponding to 3% of the opening degree of the accelerator pedal 32. For example, it may be changed depending on data of the vehicle V, such as the brake performance of the vehicle V or the like.

When it is determined in step S114 that the condition where the pressed amount (manipulation amount) of the accelerator pedal 32 is equal to or larger than the threshold accelerator manipulation amount is satisfied ("Yes" in the drawing), the process to be carried out by the acceleration suppression activation condition determination unit 34 goes to step S116.

On the other hand, when it is determined in step S114 that the condition where the pressed amount (manipulation amount) of the accelerator pedal 32 is equal to or larger than the threshold accelerator manipulation amount is not satisfied ("No" in the drawing), the process to be carried out by the acceleration suppression activation condition determination unit 34 goes to step S120.

In step S116, a process ("parking frame entering determination information acquisition process" in the drawing) of acquiring information to determine whether or not the vehicle V enters a parking frame is carried out. Herein, in the present embodiment, a case where whether or not the vehicle V enters the parking frame is determined based on the steering angle of the steering wheel 28, an angle made by the vehicle V and the parking frame, and a distance between the vehicle V and the parking frame will be described as an example. When the process of acquiring the information to determine whether or not the vehicle V enters a parking frame is carried out in step S116, the process to be carried out by the acceleration suppression activation condition determination unit 34 goes to step S118.

Herein, a specific example of the process to be carried out in step S116 will be described. In step S116, the rotation angle (steering angle) of the steering wheel 28 is acquired by referring to the steering angle signal which has been received from the steering angle operation unit 10C. In addition to this, an angle $\alpha$ made by the vehicle V and a parking frame L0 and a distance D between the vehicle V and the parking frame L0 are acquired based on the bird's-eye view image of surroundings of the vehicle V included in the bird's-eye view image signal which has been received from the surrounding environment recognition information operation unit 10A.

Figure 6:
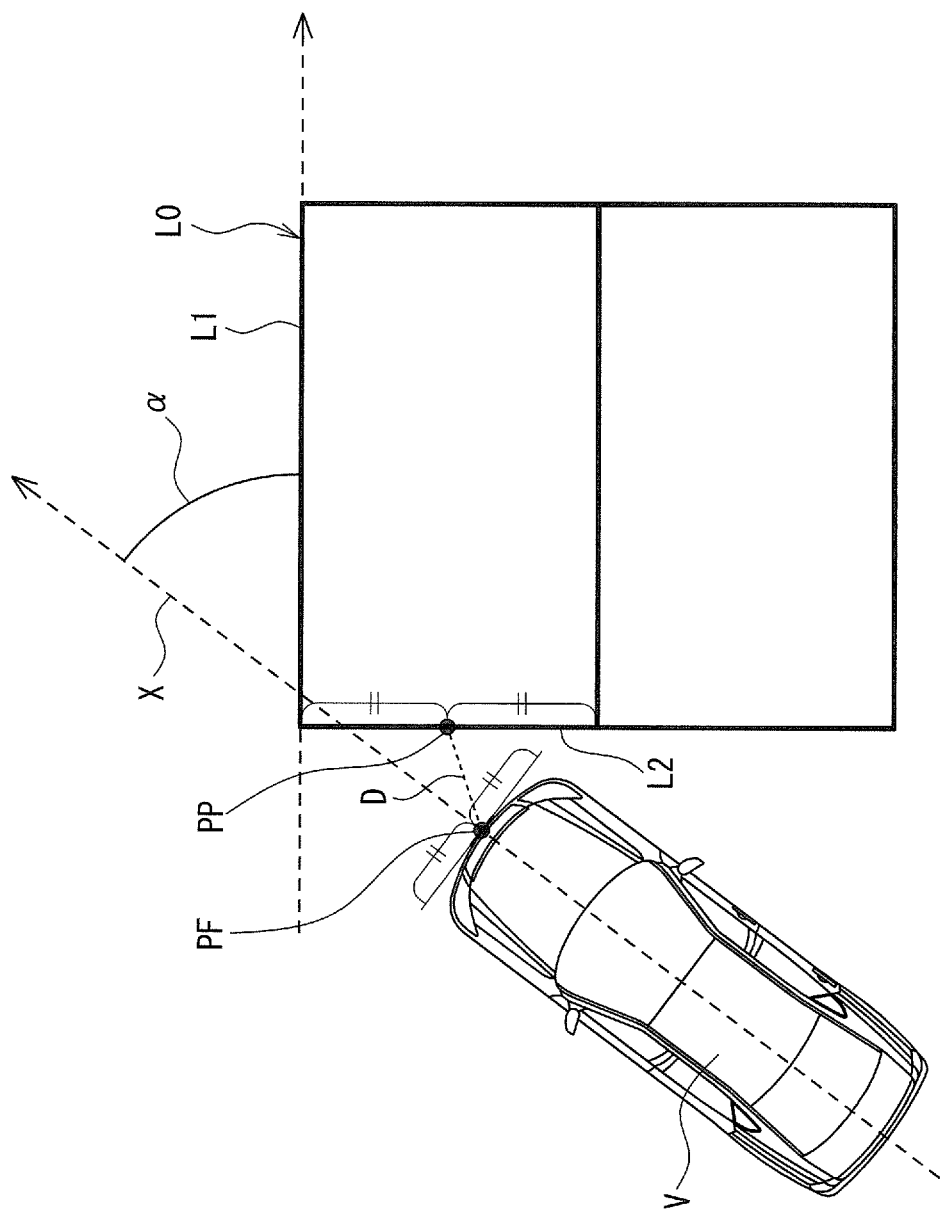
FIG. 6 is a view illustrative of a vehicle, a parking frame, and a distance between the vehicle and the parking frame.

Herein, the angle $\alpha$ is set to an absolute value of a crossing angle made by a virtual straight line X and a frame line L1 as well as a virtual line on the parking frame L0 side, for example, as illustrated in FIG. 6. It is to be noted that FIG. 6 is a view illustrative of the vehicle V, the parking frame L0, and the distance D between the vehicle V and the parking frame L0.

In addition, the straight line X is a straight line extending in the front-rear direction of the vehicle V passing through the center of the vehicle V (a virtual straight line extending in the travel direction), and the frame line L1 is a frame line to be parallel to or substantially parallel to the front-rear direction of the vehicle V when parking in the parking frame L0 is completed. In addition, the line on the parking frame L0 side is a virtual line on the parking frame L0 side, and is an extending line of the parking line L1.

In addition, the distance D is, for example, as illustrated in FIG. 6, set to a distance between a center point PF of the front end face of the vehicle V and a center point PP of an entrance L2 of the parking frame L0. The distance D, however, takes a negative value when the front end face of the vehicle V passes through the entrance L2 of the parking frame L0. It is to be noted that the distance D may be set to zero, after the front end face of the vehicle V passes through the entrance L2 of the parking frame L0.

Herein, the location on the vehicle V side for defining the distance D is not limited to the center point PF. For example, they may be a predefined location in the vehicle V and a predefined location at the entrance L2. In this case, the distance D is a distance between the predefined location in the vehicle V and the predefined location at the entrance L2.

As described heretofore, in step S116, as the information for determining whether or not the vehicle V enters the parking frame L0, the steering angle, the angle $\alpha$ of the vehicle V and the parking frame L0, and the distance D between the vehicle V and the parking frame L0 are acquired.

In step S118, based on the information acquired in step S116, a process ("parking frame entering determination process" in the drawing) of determining whether or not the vehicle V enters a parking frame is carried out.

When it is determined in step S118 that the vehicle V does not enter the parking frame ("No" in the drawing), the process to be carried out by the acceleration suppression activation condition determination unit 34 goes to step S120.

On the other hand, when it is determined in step S118 that the vehicle V enters the parking frame ("Yes" in the drawing), the process to be carried out by the acceleration suppression activation condition determination unit 34 goes to step S122.

Herein, a specific example of the process to be carried out in step S118 will be described. In step S118, when all of following three conditions (A1 to A3) are satisfied, it is determined that the vehicle V enters a parking frame.

Condition A1. An elapsed time that has been passed after the steering angle detected in step S116 is equal to or larger than a predefined steering angle (for example, 45°) is shorter than or equal to a predefined time (for example, 20 seconds).

Condition A2. The angle $\alpha$ of the vehicle V and the parking frame L0 is smaller than or equal to a predefined angle (for example, 40°).

Condition A3. The distance D between the vehicle V and the parking frame L0 is shorter than or equal to a predefined distance (for example, three meters).

It is to be noted that for the process of determining whether or not the vehicle V enters the parking frame, the process of setting the parking frame entering certainty degree by the parking frame entering certainty degree set unit 38 may be used.

Further, the process to be used for determining whether or not the vehicle V enters the parking frame is not limited to the process of using the above-described plural conditions. One or more conditions from the above-described three conditions may be used for the process of determining. In addition, the process of determining whether or not the vehicle V enters the parking frame may be carried out by using the speed of the vehicle V.

In step S120, the process ("acceleration suppression activation condition unsatisfied" in the drawing) of generating the acceleration suppression activation condition determination result signal as the information signal including a determination result that an acceleration suppression control activation condition is not satisfied is carried out. When the process of generating the acceleration suppression activation condition determination result signal including the determination result that the acceleration suppression control activation condition is not satisfied is carried out in step S120, the process to be carried out by the acceleration suppression activation condition determination unit 34 goes to step S124.

In step S122, a process ("acceleration suppression activation condition satisfied" in the drawing) of generating the acceleration suppression activation condition determination result signal as an information signal including the determination result that the acceleration suppression control activation condition is satisfied is carried out. When the process of generating the acceleration suppression activation condition determination result including the determination result that the acceleration suppression control activation condition is satisfied is carried out in step S122, the process to be carried out by the acceleration suppression activation condition determination unit 34 goes to step S124.

In step S124, a process ("acceleration suppression activation condition determination result output" in the drawing) of outputting the acceleration suppression activation condition determination result signal generated in step S120 or step S122 to the acceleration suppression instruction value operation unit 10J is carried out. When the process of outputting the acceleration suppression activation condition determination result to the acceleration suppression instruction value operation unit 10J is carried out in step S124, the process to be carried out by the acceleration suppression activation condition determination unit 34 returns (RETURN) to the process of step S100.

Figure 7:
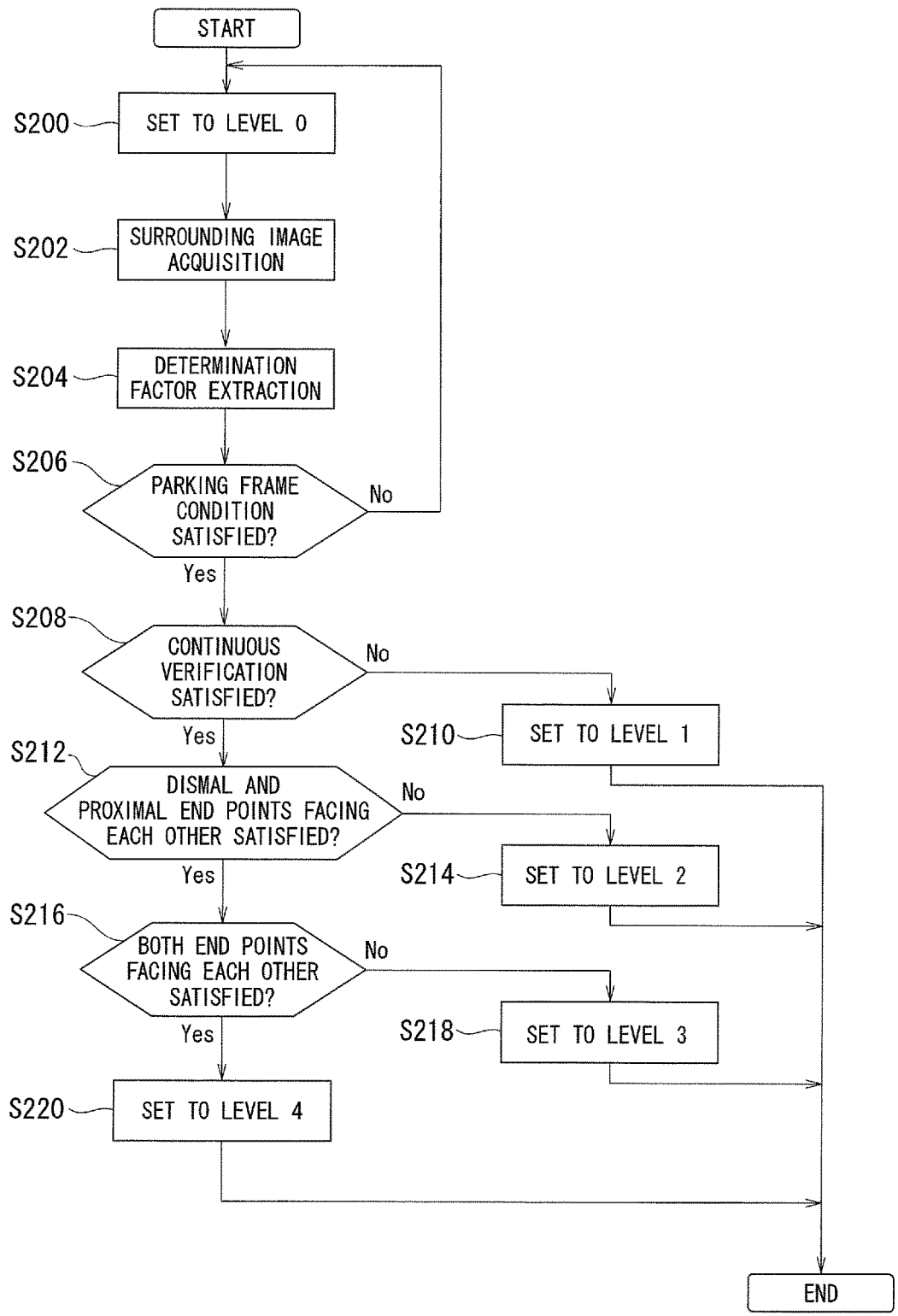
FIG. 7 is a flow chart illustrative of a process of setting the parking frame certainty degree to be carried out by the parking frame certainty degree set unit.

Referring to FIG. 1 to FIG. 6, by using FIG. 7 to FIG. 9, a process of setting the parking frame certainty degree by the parking frame certainty degree set unit 36 will be described. FIG. 7 is a flow chart illustrative of the process of setting the parking frame certainty degree by the parking frame certainty degree set unit 36. It is to be noted that the parking frame certainty degree set unit 36 is configured to operate the process to be described below at every predefined sampling time (for example, 10 msec).

As illustrated in FIG. 7, when the parking frame certainty degree set unit 36 starts a process (START), firstly, ("set to level 0" in the drawing) of setting a level of the parking frame certainty degree to a minimum (level 0) is carried out in step S200. When the process of setting the parking frame certainty degree to the level 0 is carried out in step S200, the process to be carried out by the parking frame certainty degree set unit 36 goes to step S202.

In step S202, a process ("surrounding image acquisition" in the drawing) of acquiring the bird's-eye view image of surroundings of the vehicle V included in the bird's-eye view image signal which has been received from the surrounding environment recognition information operation unit 10A is carried out. When the process of acquiring the bird's-eye view image of surroundings of the vehicle V is carried out in step S202, the process to be carried out by the parking frame certainty degree set unit 36 goes to step S204.

In step S204, from the bird's-eye view image acquired in step S202, a process ("determination factor extraction" in the drawing) of extracting a determination factor to be used for setting the parking frame certainty degree is carried out. When the process of extracting the determination factor from the bird's-eye view image is carried out in step S204, the process to be carried out by the parking frame certainty degree set unit 36 goes to step S206.

Herein, the determination factor is a line (such as a white line) indicated on a road surface such as the parking frame or the like. When, for example, all of the following three conditions (B1 to B3) are satisfied, the line is extracted as a determination factor.

Condition B1. When there is a broken portion in the line indicated on a road surface, the broken portion is the part where the indicated line is spotted or blurred (for example, a part where the clarity is lower than that of the line and is higher than that of the road surface).

Condition B2. The width of the line indicated on the road surface is equal to or larger than a predefined width (for example, 10 cm). It is to be noted that the predefined width is not limited to 10 cm. For example, it may be changed depending on the local (national) traffic regulation where the vehicle V travels.

Condition B3. The length of the line indicated on the road surface is equal to or longer than a predefined marking line length (for example, 2.5 meters). It is to be noted that the predefined marking line length is not limited to 2.5 meters. For example, it may be changed depending on the local (national) traffic regulation where the vehicle V travels.

In step S206, a process ("parking frame condition satisfied?" in the drawing) of determining whether or not the determination factor extracted in step S204 satisfies the condition of the line included in the parking line is carried out.

When it is determined in step S206 that the determination factor extracted in step S204 does not satisfy the condition of the line included in the parking line ("No" in the drawing), the process to be carried out by the parking frame certainty degree set unit 36 goes to step S200.

On the other hand, when it is determined in step S206 that the determination factor extracted in step S204 satisfies the condition of the line included in the parking line ("Yes" in the drawing), the process to be carried out by the parking frame certainty degree set unit 36 goes to step S208. It is to be noted that the process to be carried out in step S206, for example, is carried out by referring to the bird's-eye view image signal which has been received from the surrounding environment recognition information operation unit 10A.

Herein, a specific example to be carried out in the process of step S206 will be described by using FIG. 8A to FIG. 8D. It is to be noted that FIG. 8A to FIG. 8D are views illustrative of the process to be carried out by the parking frame certainty degree set unit 36. Also, in FIG. 8, code "PE" indicates a region indicative of an image captured by the front camera 14F in the bird's-eye view images.

In step S206, firstly, from the line indicated on the road surface that is the determination factor extracted in step S204, adjacent two lines displayed on the same screen are defined as one pair (hereinafter, also referred to as "pairing"). It is to be noted that when three or more lines are displayed on the same screen, two or more pairs are defined with adjacent two lines, respectively, in the three or more lines.

When, for example, all of following four conditions (C1 to C4) are satisfied for the two lines that forms the pairing, it is determined that the determination factor extracted in step S204 satisfies the condition of the line included in the parking frame line.

Figure 8A:
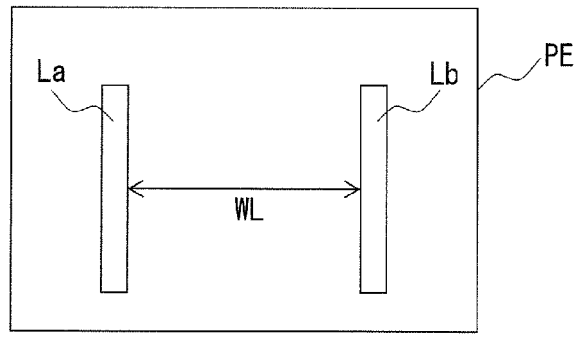
FIG. 8A to FIG. 8D are views illustrative of contents of the process to be carried out by the parking frame certainty degree set unit.

Condition C1. As illustrated in FIG. 8A, a width WL between the two lines that forms the pairing (indicated by code "La" and code "Lb" in the drawing) is smaller than or equal to a predefined pairing width (for example, 2.5 meters). It is to be noted that the predefined pairing width is not limited to 2.5 meters. For example, it may be changed depending on the local (national) traffic regulation where the vehicle V travels.

Figure 8B:
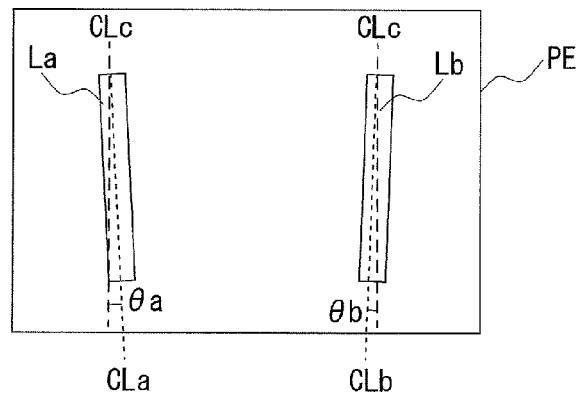

Condition C2. As illustrated in FIG. 8B, an angle made by the line La and the line Lb (parallel degree) is smaller than or equal to a predefined angle (for example, 3°). It is to be noted that the predefined angle is not limited to 3°. For example, it may be changed depending on the recognition capability or the like of the surrounding environment recognition sensor 14. It is to be noted that, in FIG. 8B, a reference line (line extending in a vertical direction of a region PE) is indicated by a dotted line with code "CLc", a central axis of the line La is indicated by a broken line with code "CLa", and a central axis of the line Lb is indicated by a broken line with code "CLb". Also, an angle of inclination of the central axis CLa relative to the reference line CLc is indicated by code "θa", and an angle of inclination of the central axis CLb relative to the reference line CLc is indicated by code "θb". Thus, when a conditional expression of |θa−θb|>=3° is satisfied, condition C2 is to be satisfied.

Figure 8C:
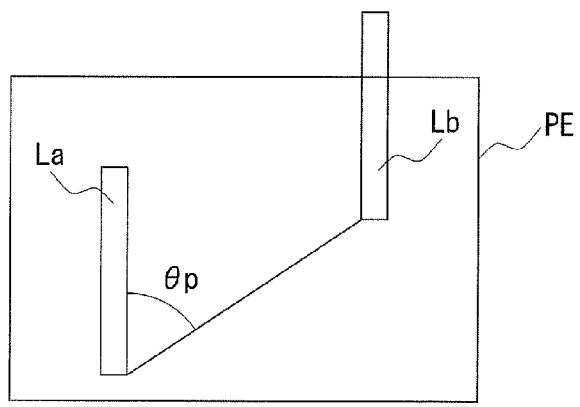

Condition C3. As illustrated in FIG. 8C, the angle θ made by a virtual straight line connecting an end of the line La on the vehicle V side (an end on the lower side in the drawing) and an end of the line Lb on the vehicle V side, and the line L on the proximity side of the vehicle V is equal to or larger than a predefined misalignment angle (for example, 45°). It is to be noted that the predefined misalignment angle is not limited to 45°. For example, it may be changed depending on the recognition capability or the like of the surrounding environment recognition sensor 14.

Figure 8D:
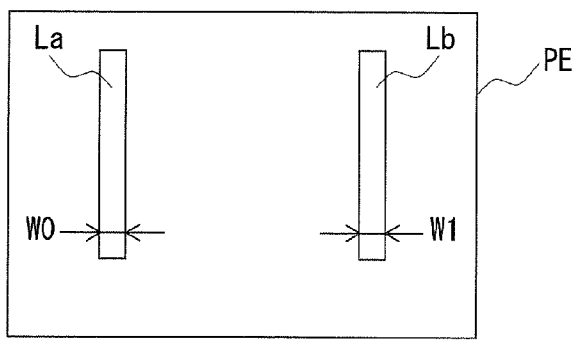

Condition C4. As illustrated in FIG. 8D, an absolute value (|W0−W1|) of a difference between the line width W0 of the line La and the line width W1 of the line Lb is smaller than or equal to a predefined line width (for example, 10 cm). It is to be noted that the predefined line width is not limited to 10 cm. For example, it may be changed depending on the recognition capability or the like of the surrounding environment recognition sensor 14.

It is to be noted that in the process of determining whether or not the above-described four conditions (C1 to C4) are satisfied, when, for example, at least one of the lengths of the line La and the line Lb is broken, for example, in two meters or so, the process continues with the line of four meters having a virtual line extending from the above-described two meters or so.

In step S208, until the travel distance of the vehicle V reaches a predefined travel distance after the process of step S206 starts, a process ("continuous verification satisfied?" in the drawing) of determining whether or not the process of step S206 is continuously verified is carried out. It is to be noted that, for example, the predefined travel distance is set within a range of 1 to 2.5 meters depending on the data of the vehicle V. Also, the process in step S208 is carried out by referring to, for example, the bird's-eye view image signal that has been received from the surrounding environment recognition information operation unit 10A and the vehicle speed operation value signal that has been received from the vehicle speed operation unit 10B.

When it is determined in step S208 that the process of step S206 is not continuously verified ("No" in the drawing), the process to be carried out by the parking frame certainty degree set unit 36 goes to step S210.

On the other hand, when it is determined in step S208 that the process of step S206 is continuously verified ("Yes" in the drawing), the process to be carried out by the parking frame certainty degree set unit 36 goes to step S212.

Figure 9:
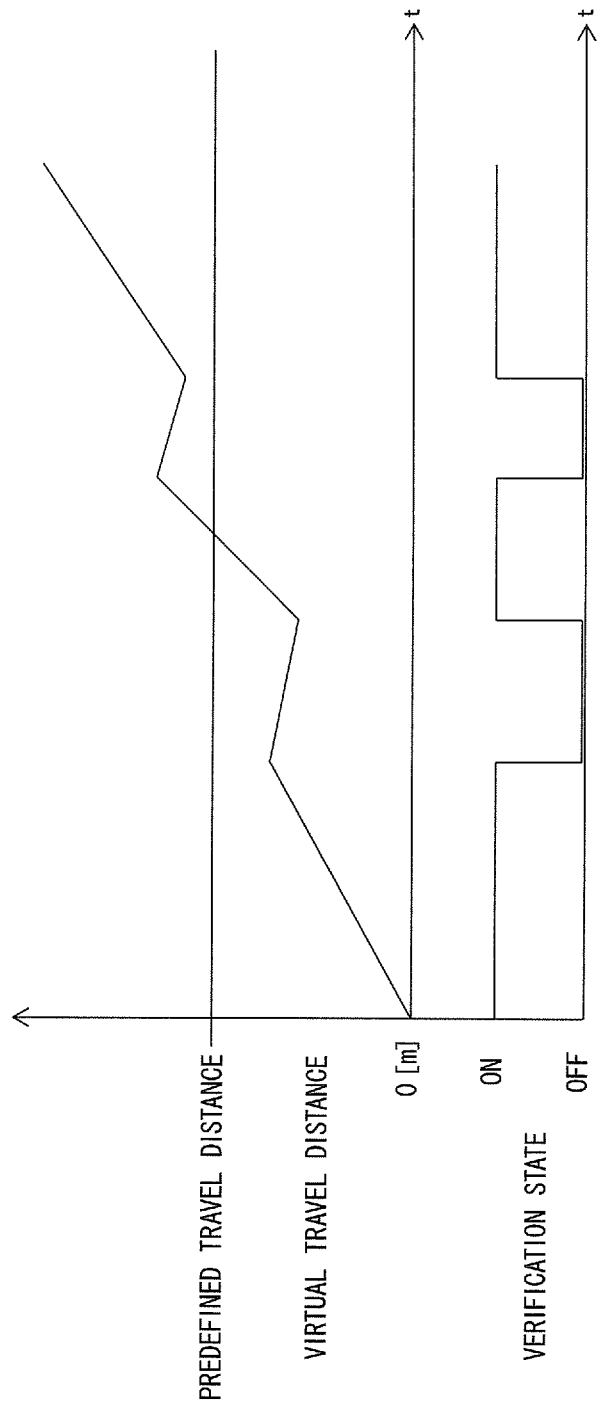
FIG. 9 is a view illustrative of contents of the process to be carried out by the parking frame certainty degree set unit.

Herein, in the process to be carried out in step S208, for example, as illustrated in FIG. 9, the travel distance of the vehicle V is virtually operated according to the state where the process of step S206 is verified and the state where the process of step S206 is not verified. It is to be noted that FIG. 9 is a view illustrative of the process to be carried out by the parking frame certainty degree set unit 36. Also, in the regions of "verification state" in FIG. 9, "ON" indicates the state where the process of step S206 is verified, whereas "OFF" indicates the state where the process of step S206 is not verified. Also, in FIG. 9, "virtual travel distance" indicates the travel distance of the vehicle V which has been virtually operated.

When the state where the process of step S206 is verified is "ON", as illustrated in FIG. 9, the virtual travel distance increases. On the other hand, when the state where the process of step S206 is verified is "OFF", the virtual travel distance decreases.

It is to be noted that in the present embodiment, as an example, a case where an inclination (increasing gain) when the virtual travel distance increases is set larger than an inclination (decreasing gain) when the virtual travel distance decreases will be described. In other words, if the state where the "verification state" is "ON" and the state where the "verification state" is "OFF" have the same period of time, the virtual travel distance will be increased.

Then, when the virtual travel distance reaches the predefined travel distance without returning to the initial value (0 meters in the drawing), it is determined that the process of step S206 is continuously making verification.

In step S210, a process ("set to level 1" in the drawing) of setting the level of the parking frame certainty degree to a one-stage higher level (level 1) than the minimum (level 0) is carried out. When the process of setting the parking frame certainty degree to the level 1 is carried out in step S210, the process to be carried out by the parking frame certainty degree set unit 36 comes to an end (END).

In step S212, with respect to the lines La and Lb which are continuously verified in the process of step S206, end points of the lines La and Lb located on the same side (end points on the proximal side or end points on the distal side) with the vehicle V being used as a reference are respectively detected. Then, a process ("dismal and proximal end points facing each other satisfied?" in the drawing) of determining whether or not the end points located on the same side face each other in the direction of the width WL is carried out. It is to be noted that the process in step S212 is carried out, for example, by referring to the bird's-eye view image signal which has been received from the surrounding environment recognition information operation unit 10A and the vehicle speed operation value signal which has been received from the vehicle speed operation unit 10B.

When it is determined in step S212 that the end points located on the same side do not face each other in the direction of the width WL ("No" in the drawing), the process to be carried out by the parking frame certainty degree set unit 36 goes to step S214.

On the other hand, when it is determined in step S212 that the end points located on the same side face each other in the direction of the width WL ("Yes" in the drawing), the process to be carried out by the parking frame certainty degree set unit 36 goes to step S216.

In step S214, a process ("set to level 2" in the drawing) of setting the level of the parking frame certainty degree to a two-stage higher level (level 2) than the minimum (level 0) is carried out. When the process of setting the parking frame certainty degree to the level 2 in step S214, the process to be carried out by the parking frame certainty degree set unit 36 comes to an end (END).

In step S216, with respect to the lines La and Lb in which it is determined that the end points located on the same side face each other in the direction of the width WL in the process of step S212, other end points located on the other side are further detected. In other words, when the end points on the proximal side (one side) of the lines La and Lb are detected in the process of step S212, the end points on the distal side (the other side) of the lines La and Lb are detected in step S216. Then, a process ("both end points facing each other satisfied?" in the drawing) of determining whether or not the end points located on the other side face each other in the direction of the width WL is carried out. It is to be noted that the process in step S216 is carried out, for example, by referring to the bird's-eye view image signal which has been received from the surrounding environment recognition information operation unit 10A and the vehicle speed operation value signal which has been received from the vehicle speed operation unit 10B.

It is to be noted that when the end points of the lines La and Lb are detected, for example, an end point of a straight line like an end point of a line as illustrated in FIG. 4A, an end point having a letter U shape like an upper end point of a line as illustrated in FIG. 4G, and a crossing point of a double line and a horizontal line as illustrated in FIG. 4O are all processed as an end point of a straight line. Similarly, an end point of a double line like an upper end point of a line as illustrated in FIG. 4H and an end point having a gap portion in a letter U shaped curved line like an upper end point of a line as illustrated in FIG. 4M are all processed as an end point of a straight line.

Also, when the end points of the lines La and Lb are detected, for example, a crossing point of a slanted double line extending in top-bottom direction illustrated in FIG. 4N and a single straight line extending in the left-right direction is not processed (recognized) as an end point. This is because, when an end point is detected, the end point is scanned for detection in a lateral direction in a region indicative of the captured image. Also, for example, since a region indicated by a white square in FIG. 4P indicates an object on the road, such as a pole or the like, an end point of such an object is not detected, either.

When it is determined in step S216 that the end points located on the other side do not face each other in the direction of the width WL ("No" in the drawing), the process to be carried out by the parking frame certainty degree set unit 36 goes to step S218.

On the other hand, when it is determined in step S216 that the end points located on the other side face each other in the direction of the width WL ("Yes" in the drawing), the process to be carried out by the parking frame certainty degree set unit 36 goes to step S220.

In step S218, a process ("set to level 3" in the drawing) of setting the level of the parking frame certainty degree to a three-stage higher (level 3) than the minimum (level 0) is carried out. When the process of setting the parking frame certainty degree to the level 3 is carried out in step S218, the process to be carried out by the parking frame certainty degree set unit 36 comes to an end (END).

In step S220, a process ("set to level 4" in the drawing) of setting the level of the parking frame certainty degree to a four-stage higher (level 4) than the minimum (level 0) is carried out. When the process of setting the parking frame certainty degree to the level 4 is carried out in step S220, the process to be carried out by the parking frame certainty degree set unit 36 comes to an end (END).

Thus, in the process of setting the parking frame certainty degree to the level 3, the parking frame certainty degree is to be set for FIG. 4D, FIG. 4E, FIG. 4J, and FIG. 4K patterns in the parking frames illustrated in FIG. 4A to FIG. 4P. Also, in the process of setting the parking frame certainty degree to the level 4, the parking frame certainty degree is to be set for any patterns except for (FIG. 4D, FIG. 4E, FIG. 4J, and FIG. 4K patterns in the parking frames illustrated in FIG. 4A to FIG. 4P.

Herein, the process by the parking frame certainty degree set unit 36 has been described for setting the certainty degree for a single parking frame. However, for example, two or more parking frames can be recognized at the same time, when plural parking frames are arranged in parallel as illustrated in FIG. 6.

Figure 10:
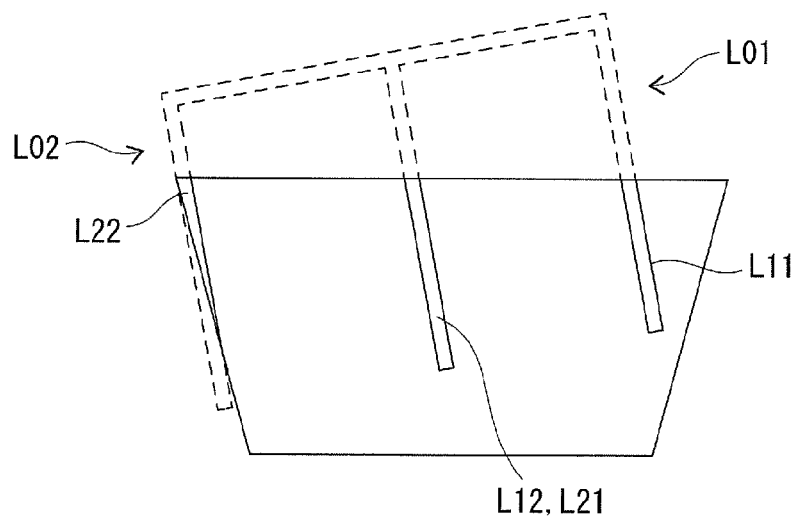
FIG. 10 is a view illustrative of a necessity of a process of correcting to be carried out by the parking frame certainty degree set unit.

That is, in a situation where the vehicle V travels while making a turn and approaching the parking frame diagonally, unlike a situation of approaching from the proximal side in parallel, the ways that two parking frames L01 and L02 arranged in alignment appear in a surrounding image are different from each other in many cases, as illustrated in FIG. 10. An example of FIG. 10 illustrates an image of a front side of the vehicle. As to the parking frame L01, considerable parts in the entire of a right side frame line L11 and a left side frame line L12 can be confirmed, and the end points of the proximal sides are captured in the image, too. In contrast, as to the parking frame L02, a considerable part in the right side frame line L21 also serving as the left side frame line L12 of the parking frame L01 can be confirmed, whereas the left side frame line L22 slightly appears in the image.

For this reason, even if the pairing illustrated in FIG. 8A can be made for the parking frame L01, the pairing for the parking frame L02 cannot be made at the same timing. Also, even if the pairing can be made for the parking frame L02, the end point of the proximal side of the left side frame line L22 cannot be confirmed at present, and thus the parking frame L02 is not promoted to the level 2.

Thus, although the parking frames L01 and L02 are arranged on the left and right and close to each other, a case where there occurs a difference in the progress degree in the process of setting the parking frame certainty degree illustrated in FIG. 7 can be considered. For example, even if the parking frame certainty degree of the parking frame L01 has reached the level 2, it can be considered that the parking frame certainty degree of the parking frame L02 still remains in the level 0 or has just reached the level 1.

In those cases, substantially, the same parking frame should be confirmed. Therefore, originally, it can be said that an identical or a similar parking frame certainty degree should be desirably set. Thus, in the present embodiment, in a state where plural possible parking frames are confirmed, that is, when plural parking frame certainty degrees are demanded, the process illustrated in FIG. 11 is carried out to correct the parking frame certainty degree.

Figure 11:
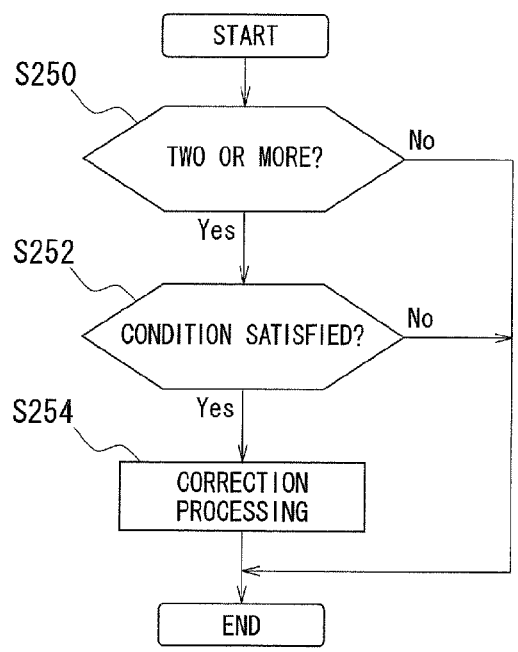
FIG. 11 is a flow chart illustrative of the process of correcting the parking frame certainty degree to be carried out by the parking frame certainty degree set unit.

That is to say, in step S250 of FIG. 11, it is determined that whether or not two or more parking frames are detected. To be specific, as illustrated in FIG. 10, it is confirmed whether or not the parking frame certainty degree is set to the first parking frame L01, and in addition, whether or not the parking frame certainty degree is set to the second parking frame L02. In this case, as to the first parking frame L02 having a lower parking frame certainty degree, any parking frame line may be confirmed as far as the pairing can be made (that is, a determination of step S206 in FIG. 7 is "Yes"). Alternatively, the other parking frame L02 only has to be confirmed as far as any line like a parking frame line can be confirmed. "any line like a parking frame line can be confirmed" means that for example, a case where the line having a similar width to the width of another parking frame line, a comparatively long part of which has been confirmed as an image, can be confirmed, or a case where a line in parallel with the parking frame line that can be confirmed by the front camera 14F can be confirmed in the image of the right side camera 14SR or the left side camera 14SL, although such a line cannot be confirmed in the image of the front camera 14F. When the determination of the step S250 is "No", the process illustrated in FIG. 11 ends at this timing.

On the other hand, when the determination of step S250 is "Yes", processing goes to step S252 to determine whether or not a condition to correct the parking frame certainty degree is satisfied. In this situation, various kinds of conditions can be considered as a condition to correct the parking frame certainty degree. However, for example, it can be considered that the vehicle V is in a turning travel state, two parking frames share a single parking frame line (like a situation of FIG. 10), one of the parking frame certainty degrees, which has a higher degree, is higher than the level 1, which is the lowest level (in other words, it is equal to or higher than the level 2), and the like.

A reason why "the vehicle V is in a turning travel state" is listed as a condition is that in the turning travel state, it is difficult for an imaging camera to capture the parking frame located out of the front face as compared to the straight travel state, and it has been difficult to capture the parking frame but suddenly becomes easy to see the parking frame at a certain stage, while the vehicle V is traveling, and the parking frame certainty degree is increased in some cases. In other words, although the parking frame certainty degree of the parking frame L02 is low in the situation such as the situation in FIG. 10, if the vehicle V is in a turning state to the left, the parking frame certainty degree is increased after the vehicle V travel. Therefore, it can be said that there is a benefit if the correction is made at an early stage to increase the parking frame certainty degree. In contrast, even if the image such as FIG. 10 is captured in the straight travel state, the parking frame certainty degree of the parking frame L02 is not increased, as the vehicle V travels. Rather, the confirmation of the parking frame itself is becoming impossible. Hence, it can be said that there is no reason for increasing the parking frame certainty degree.

It is to be noted that whether or not the vehicle V is in a turning state can be determined based on the steering angle signal to be supplied from the steering angle operation unit 10C.

A reason why "two parking frames share a single parking frame line" is listed as a condition is that there will be no problem, if one of the parking frame certainty degrees is high, and even if the other thereof is increased, in the two parking frames that share a single parking frame line. Rather, it can be a good situation. Sharing the parking frame line can be determined based on whether or not the lines that have been confirmed at the same location when the pairing is made can be used as the parking frame lines of two parking frames.

A reason why "one of the parking frame certainty degrees, which has a higher degree is higher than the lowest level" is listed as a condition is that if the correction is made for even the higher parking frame certainty degree that has just reached equal to or lower than the lowest level, there will be a higher possibility that the parking frame certainty degree is increased unnecessarily.

In addition, in the present embodiment, a description will be also given of a case where the above three conditions are used for making an AND condition. However, each of the conditions may be used for making an OR condition to the other conditions. Parts of the conditions may be used for making an OR condition and the remaining conditions may be used for making an AND condition with a result of the OR condition.

When the determination of step S252 is "No", the process of FIG. 11 ends at this timing without changing each parking frame certainty degree. Then, when the determination of step S252 is "Yes", processing goes to step S254, and the correction process of correcting the parking frame certainty degree is carried out. There are various kinds of processing for the correction process in step S252.

For example, in the two parking frames arranged in alignment, it is considered that the correction process of adding a half of the higher parking frame certainty degree to the other parking frame certainty degree.

To be specific, the correction process is carried out such that when one of the parking frame certainty degrees is the level 2 and the other of the parking frame certainty degrees is the level 1, "1", which is a half of the level 2, is added to the other of the parking frame certainty degree to make it to the level 2. Instead of such an addition process, the correction process may be carried out on a rule that all certainty degrees are made to the higher parking frame certainty degree (that is, select high), or another kind of correction process may be carried out.

The point is that any processing content may be applicable as far as the lower parking frame certainty degree is corrected to be higher based on the higher parking frame certainty degree. Further, when both of the parking frame certainty degrees are same on a high level (in other words, when all levels are the level 2 or the level 3), the process of increasing all the parking frame certainty degrees to be one-stage higher (i.e., the level 2 is made higher to the level 3, the level 3 is made higher to the level 4) may be included.

Furthermore, when three or more possible parking frames can be confirmed, the above-described correction process may be carried out for adjacent parking frames, or based on the highest parking frame certainty degree in the three parking frame certainty degrees, the other parking frame certainty degrees may be corrected. Then, when the process of step S254 is completed, the process of FIG. 11 ends at this timing.

Figure 12:
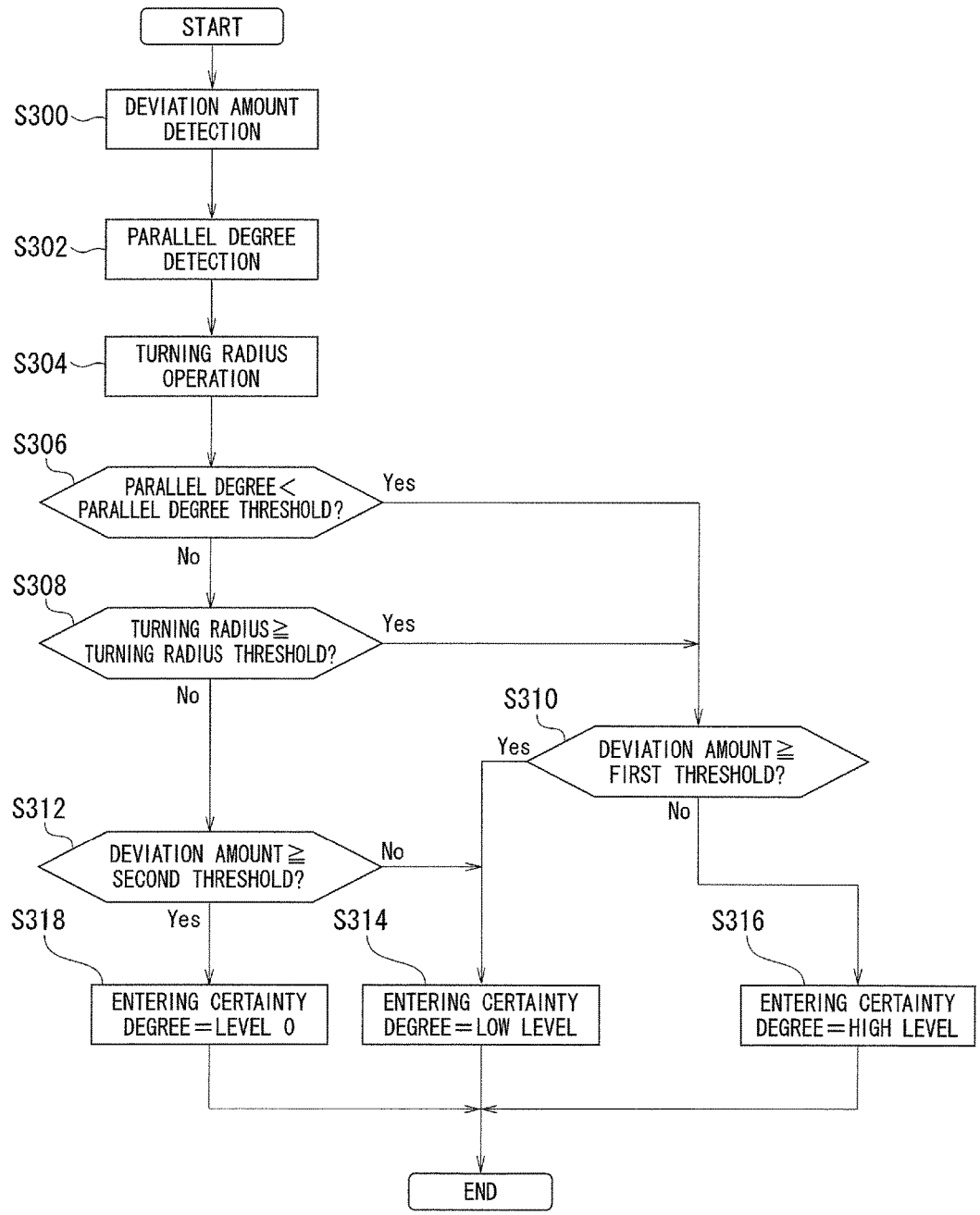
FIG. 12 is a flow chart illustrative of the process of setting the parking frame entering certainty degree by a parking frame entering certainty degree set unit.

Referring to FIG. 1 to FIG. 9, by using FIG. 12 and FIG. 13, a process of setting the parking frame entering certainty degree by the parking frame entering certainty degree set unit 38 will be described. FIG. 12 is a flow chart illustrative of the process of setting the parking frame entering certainty degree by the parking frame entering certainty degree set unit 38. It is to be noted that the parking frame entering certainty degree set unit 38 is configured to carry out a process to be described below at every predefined sampling time (for example, 10 msec).

As illustrated in FIG. 12, when the parking frame entering certainty degree set unit 38 starts the process (START), firstly, in step S300, a process ("deviation amount detection" in the drawing) of detecting a deviation amount between an anticipated trace of the vehicle V and the parking frame is carried out. When the process of detecting the deviation amount between the anticipated trace of the vehicle V and the parking frame is carried out in step S300, the process to be carried out by the parking frame entering certainty degree set unit 38 goes to step S302. It is to be noted that in the present embodiment, as an example, a case where centimeter is set as a unit of the deviation amount detected in step S300 will be described. Also, in the present embodiment, the width of the parking frame is set to 2.5 meters, as an example, will be described.

Figure 13:
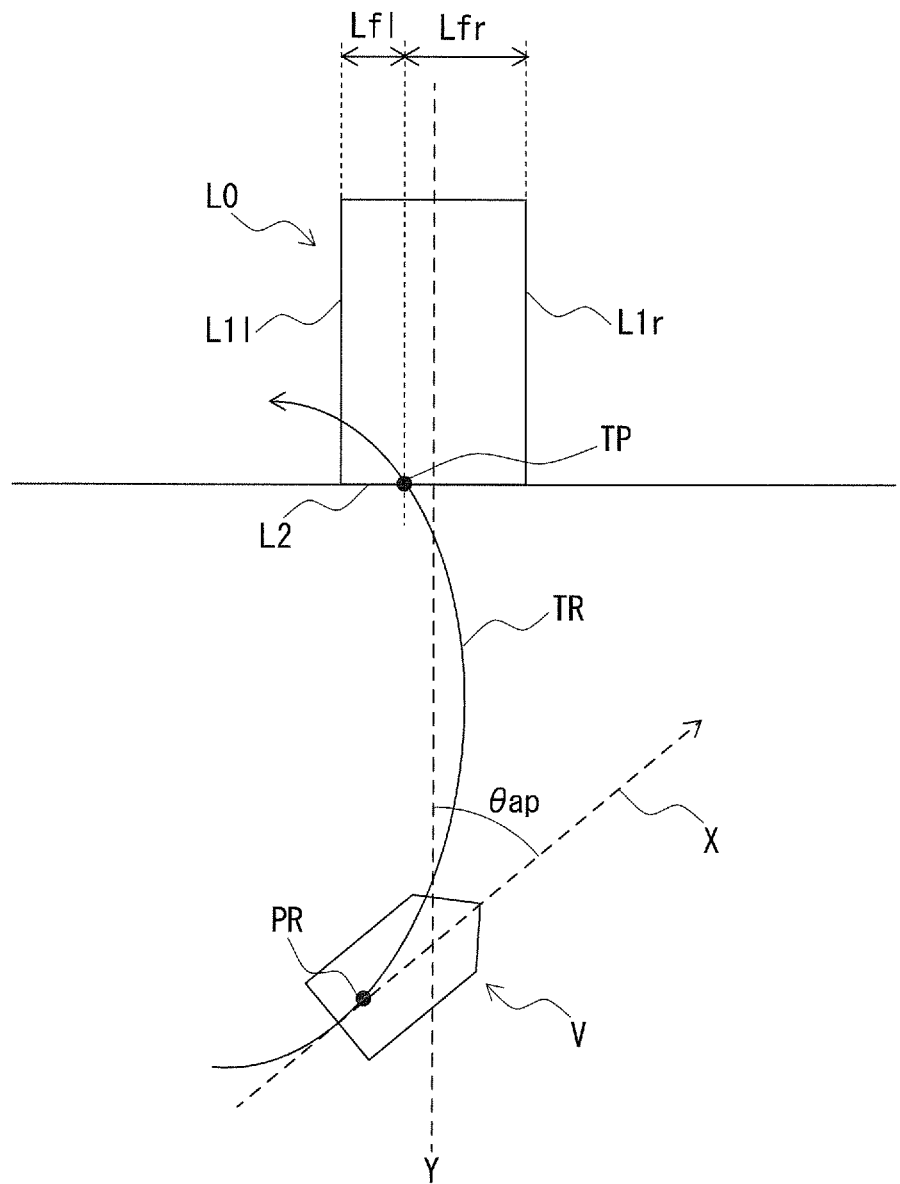
FIG. 13 is a view illustrative of contents of a process of detecting a deviation amount between an anticipated trace of the vehicle and the parking frame.

Herein, in the process to be carried out in step S300, for example, a rear wheel anticipated trace TR of the vehicle V is calculated as illustrated in FIG. 13, and a crossing point TP between the rear wheel anticipated trace TR that has been calculated and an entrance L2 of the parking frame L0 is calculated. Further, a distance Lfl between a left side frame line L11 of the parking frame L0 and the crossing point TP and a distance Lfr between the right side frame line Llr of the parking frame L0 and the crossing point TP are calculated, and then the distance Lfl is compared with the distance Lfr. Then, the distance of longer one of the distance Lfl and the distance Lfr is detected as the deviation amount between the rear wheel anticipated trace TR of the vehicle V and the parking frame L0. It is to be noted that FIG. 13 is a view illustrative of the process of detecting the deviation amount between the rear wheel anticipated trace TR of the vehicle V and the parking frame L0.

Also, when the rear wheel anticipated trace TR of the vehicle V is calculated, a center point PR in the vehicle width direction between a right rear wheel WRR and a rear left wheel WRL in the vehicle V is set as a reference point of the vehicle V. Then, by using the images captured by the front camera 14F and the left side camera 14SL in the bird's-eye view images, the speed of the vehicle V, and the rotation angle (a steering angle) of the steering wheel 28, a virtual moving pathway of the center point PR is operated, and the rear wheel anticipated trace TR is calculated.

In step S302, for example, by using the image captured by the front camera 14F in the bird's-eye view images, a process ("parallel degree detection" in the drawing) of detecting a parallel degree of a straight line X and the parking frame L0 in a length direction (for example, depth direction) is carried out. When the process of detecting the parallel degree of the straight line X and the parking frame L0 in the length direction is carried out in step S302, the process to be carried out by the parking frame entering certainty degree set unit 38 goes to step S304.

Herein, the parallel degree to be detected in step S302, as illustrated in FIG. 13, is detected as an angle θap made by the center line Y of the parking frame L0 and the straight line X.

It is to be noted that in step S302, when the vehicle V moves into the parking frame L0 while moving backward, for example, by using the image that has been captured by the rear camera 14R in the bird's-eye view images, the process of detecting the parallel degree of the straight line X and the length direction of the parking frame L0. Herein, for example, the moving direction (forward movement or backward movement) of the vehicle V is detected by referring to a current shift position signal.

In step S304, by using the speed of the vehicle V and the rotation angle (steering angle) of the steering wheel 28, a process ("turning radius operation" in the drawing) of operating a turning radius of the vehicle V is carried out. When the process of operating the turning radius of the vehicle V is carried out in step S304, the process to be carried out by the parking frame entering certainty degree set unit 38 goes to step S306.

In step S306, a process ("parallel degree<parallel degree threshold?" in the drawing) of determining whether or not the parallel degree (θap) detected in step S302 is lower than a predefined parallel degree threshold (for example, 15°) is carried out.

When the parallel degree (θap) detected in step S302 is determined to be equal to or higher than the parallel degree threshold ("No" in the drawing) in step S306, the process to be carried out by the parking frame entering certainty degree set unit 38 goes to step S308.

On the other hand, when the parallel degree (θap) detected in step S302 is determined to be lower than the parallel degree threshold ("Yes" in the drawing) in step S306, the process to be carried out by the parking frame entering certainty degree set unit 38 goes to step S310.

In step S308, a process ("turning radius>=turning radius threshold?" in the drawing) of determining whether or not the turning radius detected in step S304 is equal to or higher than a predefined turning radius threshold (for example, 100 R) is carried out.

When the turning radius detected in step S304 is determined to be lower than the turning radius threshold ("No" in the drawing) in step S308, the process to be carried out by the parking frame entering certainty degree set unit 38 goes to step S312.

On the other hand, when the turning radius detected in step S304 is determined to be equal to or higher than the turning radius threshold ("Yes" in the drawing) in step S308, the process to be carried out by the parking frame entering certainty degree set unit 38 goes to step S310.

In step S310, a process ("deviation amount>=first threshold?" in the drawing) of determining whether the deviation amount detected in step S300 is equal to or higher than a predefined first threshold (for example, 75 cm) is carried out. It is to be noted that the first threshold is not limited to 75 cm. For example, it may be changed depending on the data of the vehicle V.

When it is determined in step S310 that the deviation amount detected in step S300 is equal to or higher than the first threshold ("Yes" in the drawing), the process to be carried out by the parking frame entering certainty degree set unit 38 goes to step S314.

On the other hand, when it is determined in step S310 that the deviation amount detected in step S300 is lower than the first threshold ("No" in the drawing), the process to be carried out by the parking frame entering certainty degree set unit 38 goes to step S316.

In step S312, a process ("deviation amount>=second threshold?" in the drawing) of determining whether the deviation amount detected in step S300 is equal to or higher than a predefined second threshold (for example, 150 cm) is carried out. Here, the second threshold is configured to take a value larger than the first threshold. It is to be noted that the second threshold is not limited to 150 cm. For example, it may be changed depending on the data of the vehicle V.

When the deviation amount detected in step S300 is determined to be equal to or higher than the second threshold ("Yes" in the drawing) in step S312, the process to be carried out by the parking frame entering certainty degree set unit 38 goes to step S318.

On the other hand, when it is determined in step S312 that the deviation amount detected in step S300 is determined to be lower than the second threshold ("No" in the drawing), the process to be carried out by the parking frame entering certainty degree set unit 38 goes to step S314.

In step S314, a process of setting the parking frame entering certainty degree to a low level ("entering certainty degree=low level" in the drawing) is carried out. When the process of setting the parking frame entering certainty degree to a low level is carried out in step S314, the process to be carried out by the parking frame entering certainty degree set unit 38 comes to an end (END).

In step S316, a process of setting the parking frame entering certainty degree to a high level ("entering certainty degree=high level" in the drawing) is carried out. When the process of setting the parking frame entering certainty degree to a high level is carried out in step S316, the process to be carried out by the parking frame entering certainty degree set unit 38 comes to an end (END).

In step S318, a process of setting the parking frame entering certainty degree to the minimum (level zero) ("entering certainty degree=level 0" in the drawing) is carried out. When the process of setting the parking frame entering certainty degree to the level 0 in step S318, the process to be carried out by the parking frame entering certainty degree set unit 38 comes to an end (END).

As described above, the parking frame entering certainty degree set unit 38 is configured to set the parking frame entering certainty degree to any one of the "level 0" of the minimum, "low level", which is higher than the level 0, and "high level", which is higher than the low level.

Herein, when there are plural parking frames on the front side of the vehicle V, for example, as in the case of the parking frame certainty degree, the parking frame entering certainty degree will also be set for every possible parking frame.

Figure 14:
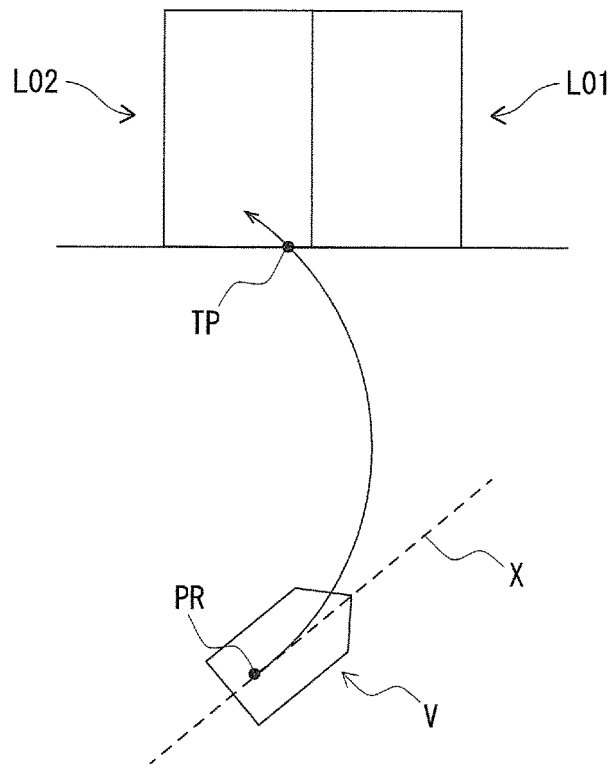
FIG. 14 is a view illustrative of a necessity of correction process to be carried out by the parking frame certainty degree set unit.

For example, as illustrated in FIG. 14, when there are two parking frames L01 and L02 on the front side of the vehicle V, even if the parking frame L01 on the right side is located on the front side of the vehicle V, in the situation where the vehicle V is approaching the parking frames L01 and L02, while making a turn to the left at a large steering angle, the parking frame entering certainty degree to the parking frame L01 may be set to the level 0.

Even in such a situation, it can be considered that the parking frame certainty degree of the parking frame L01 which is located in front of the vehicle V is set to, for example, the level 2 or the level 3.

On the other hand, as to the parking frame L02 located on the left side, it can be considered that the parking frame certainty degree (before the correction process) is low. However, while the vehicle V is making a turn at a large steering angle, it can be considered that the parking frame entering certainty degree to the parking frame L02 is set to a high value of the level 2, for example.

In other words, without the correction process, a reversed relationship can be considered such that as to the parking frame L01, a high value is set to the parking frame certainty degree, whereas a low value is set to the parking frame entering certainty degree, and as to the parking frame L02, a low value is set to the parking frame certainty degree, whereas a high value is set to the parking frame entering certainty degree. In such a situation, the total certainty degree to be described later will be set to low and therefore the acceleration suppression control will not operate as a result.

Thus, in the present embodiment, the correction process of correcting the parking frame certainty is carried out as described above. In this situation, however, by carrying out the correction process of correcting the parking frame entering certainty degree, the total certainty degree is set to an appropriate value with a higher certainty.

Figure 15:
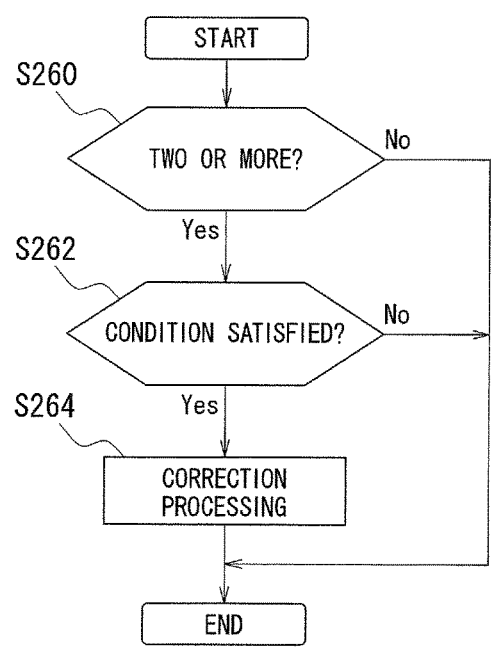
FIG. 15 is a flow chart illustrative of a process of correcting the parking frame entering certainty degree by a parking frame entering certainty degree set unit.

That is to say, the parking frame entering certainty degree set unit 38 in the present embodiment is configured to carry out the process illustrated in FIG. 15. In step S260 of FIG. 15, it is determined whether or not two or more parking frames are detected. Since the process in step S260 may be identical to that of step S250 of FIG. 11, a determination result of step S250 of FIG. 11 may be used. When the determination result of step S260 is "No", the process illustrated in FIG. 15 ends at this timing.

On the other hand, when the determination result of step S260 is "Yes", the process goes to step S262 to determine whether or not a condition to correct the parking frame certainty degree is established. In this situation, various kinds of conditions can be considered as a condition to correct the parking frame entering certainty degree. Like the process of step S262 in FIG. 11, however, for example, it can be considered that the vehicle V is in a turning travel state, two parking frames share a single parking frame line (which is a situation like FIG. 10), and one of the parking frame entering certainty degrees, which has a higher degree, is higher than the low level, which is the minimum (in other words, it is a "high level").

The reason why these three conditions are listed is same as the reason why the three conditions are listed as the conditions to carry out the correction process of correcting the parking frame certainty degree.

Then, when making a determination on whether or not the parking frame entering certainty degree should be corrected, the following description will be given with the above three conditions being used as an AND condition. However, each condition may be used as an OR condition to the other conditions. Parts of the conditions may be an OR condition, and for its result, remaining conditions may be used as an AND condition. When the determination of step S262 is "No", the processing of FIG. 15 ends at this timing without changing each parking frame certainty degree.

Then, when the determination of step S262 is "Yes", the processing goes to step S264, and the correction process of correcting the parking frame entering certainty degree is carried out.

Various types of correction process are conceivable for the correction process in step S262. In the present embodiment, however, the parking frame entering certainty degree is set in two stages of a low level and a high level, the rule called select high is to be applied for the correction process. It is to be noted that when the parking frame entering certainty degree is set in three or more stages, like the parking frame certainty degree, the correction process can be considered such that, for example, in the two parking frames arranged in alignment, a half of a higher parking frame certainty degree is added to the other parking frame certainty degree. The point is that any processing content may be applicable as far as a lower parking frame entering certainty degree is corrected to be higher based on a higher parking frame entering certainty degree. Also, when three or more possible parking frames can be confirmed, the correction process having the above content may be carried out between the adjacent parking frames, or based on the highest certainty degree of three parking frame certainty degrees, the other parking frame certainty degrees may be corrected. Then, when the process of step S264 is ended, the process of FIG. 15 comes to an end at this timing.

Referring to FIG. 1 to FIG. 15, by using FIG. 16, a process of setting the total certainty degree by the total certainty degree set unit 40 will be described. The total certainty degree set unit 40 is configured to receive inputs of the parking frame certainty degree signal and the parking frame entering certainty degree signal, and to apply the parking frame certainty degree included in the parking frame certainty degree signal and the parking frame entering certainty degree included in the parking frame entering certainty degree signal, on a total certainty degree setting map illustrated in FIG. 16. Then, the total certainty degree is configured to be set based on the parking frame certainty degree and the parking frame entering certainty degree.

It is to be noted that FIG. 16 is a view illustrative of the total certainty degree setting map. Also, in FIG. 16, the parking frame certainty degree is indicated as "frame certainty degree" and the parking frame entering certainty degree is indicated as "entering certainty degree". In addition, the total certainty degree setting map illustrated in FIG. 16 is a map to be used while the vehicle V is traveling forward.

As an example of the process of setting the total certainty degree by the total certainty degree set unit 40, when the parking frame certainty degree is "level 3" and the parking frame entering certainty degree is "high level", the total certainty degree is set to "high" as illustrated in FIG. 16.

It is to be noted that in the present embodiment, as an example, a description will be also given of a case where when the total certainty degree set unit 40 carries out the process of setting the total certainty degree, a process of storing the total certainty degree that has been set in a memory from which data is not deleted even if an ignition switch is turned to an off state. Herein, even if the ignition switch is in the off state, the memory from which the data is not deleted is, for example, a ROM or the like.

Thus, in the present embodiment, when the ignition switch is set to the off state after parking the vehicle V is completed and the ignition switch is turned to an on state when restarting the vehicle V, the total certainty degree that has been previously set is stored. For this reason, it is possible to start the control from the time when the ignition switch is turned to the on state at the time of restarting the vehicle V based on the total certainty degree that has been previously set.

Referring to FIG. 1 to FIG. 16, by using FIG. 17, a process of operating an acceleration suppression control start timing by the acceleration suppression control start timing operation unit 42 will be described.

The acceleration suppression control start timing operation unit 42 is configured to receive an input of the total certainty degree signal, and to apply the total certainty degree included in the total certainty degree signal on an acceleration suppression condition operation map illustrated in FIG. 17. Then, the acceleration suppression control start timing is operated based on the total certainty degree.

It is to be noted that FIG. 17 is a view illustrative of the acceleration suppression condition operation map. Also, in FIG. 17, in a column of the "acceleration suppression condition", the acceleration suppression control start timing is indicated by "suppression control start timing (accelerator opening degree)".

As an example of the process to be carried out the acceleration suppression control start timing operation unit 42, when the total certainty degree is "high", as illustrated in FIG. 17, the acceleration suppression control start timing is configured to be set to a timing when the opening degree of the accelerator pedal 32 increases and reaches "50%". It is to be noted that the opening degree of the accelerator pedal 32 is configured to be set a state where the accelerator pedal 32 is pressed (manipulated) to a maximum to 100%.

It is to be noted that the acceleration suppression control start timing of FIG. 17 is an example, and it may be changed depending on the data of the vehicle V such as a brake performance of the vehicle V. Also, for example, it may be changed depending on the local (national) traffic regulation where the vehicle V travels.

Referring to FIG. 1 to FIG. 17, a process of operating the acceleration suppression control amount by the acceleration suppression control amount operation unit 44 will be described. The acceleration suppression control amount operation unit 44 is configured to receive an input of the total certainty degree signal, and to apply the total certainty degree included in the total certainty degree signal on the acceleration suppression condition operation map illustrated in FIG. 17. Then, an acceleration suppression control amount is operated based on the total certainty degree. It is to be noted that in FIG. 17, the acceleration suppression control amount is indicated by "suppression amount" in a column of the "acceleration suppression condition".

When the total certainty degree is "high" as an example of the process to be carried out by the acceleration suppression control amount operation unit 44, the acceleration suppression control amount is configured to be set to the control amount such that the throttle opening degree is suppressed to a "medium" level with respect to the actual opening degree of the accelerator pedal 32, as illustrated in FIG. 17. It is to be noted that, in the present embodiment, as an example, the "medium" level of the throttle opening degree is configured to suppress the actual opening degree of the accelerator pedal 32 to 25%. Similarly, a "low" level of the throttle opening degree is configured to suppress the actual opening degree of the accelerator pedal 32 to 50%, and a "high" level of the throttle opening degree is configured to suppress the actual opening degree of the accelerator pedal 32 to 10%.

It is to be noted that the acceleration suppression control amount illustrated in FIG. 17 is an example, and it may be changed depending on the data of the vehicle V such as a brake performance of the vehicle V. Also, for example, it may be changed depending on the local (national) traffic regulation where the vehicle V travels.

In addition, the acceleration suppression control amount operation unit 44 is configured to apply the total certainty degree to the acceleration suppression condition operation map, and to set a presence or absence of the control to output a beep. It is to be noted that when a beep is output, character information of the contents of operating the acceleration suppression condition, the visual information such as codes or light emission, or the like may be displayed on a display monitor included in the navigation device 26.

(Process to be Carried Out by in the Acceleration Suppression Instruction Value Operation Unit 10J)

Figure 18:
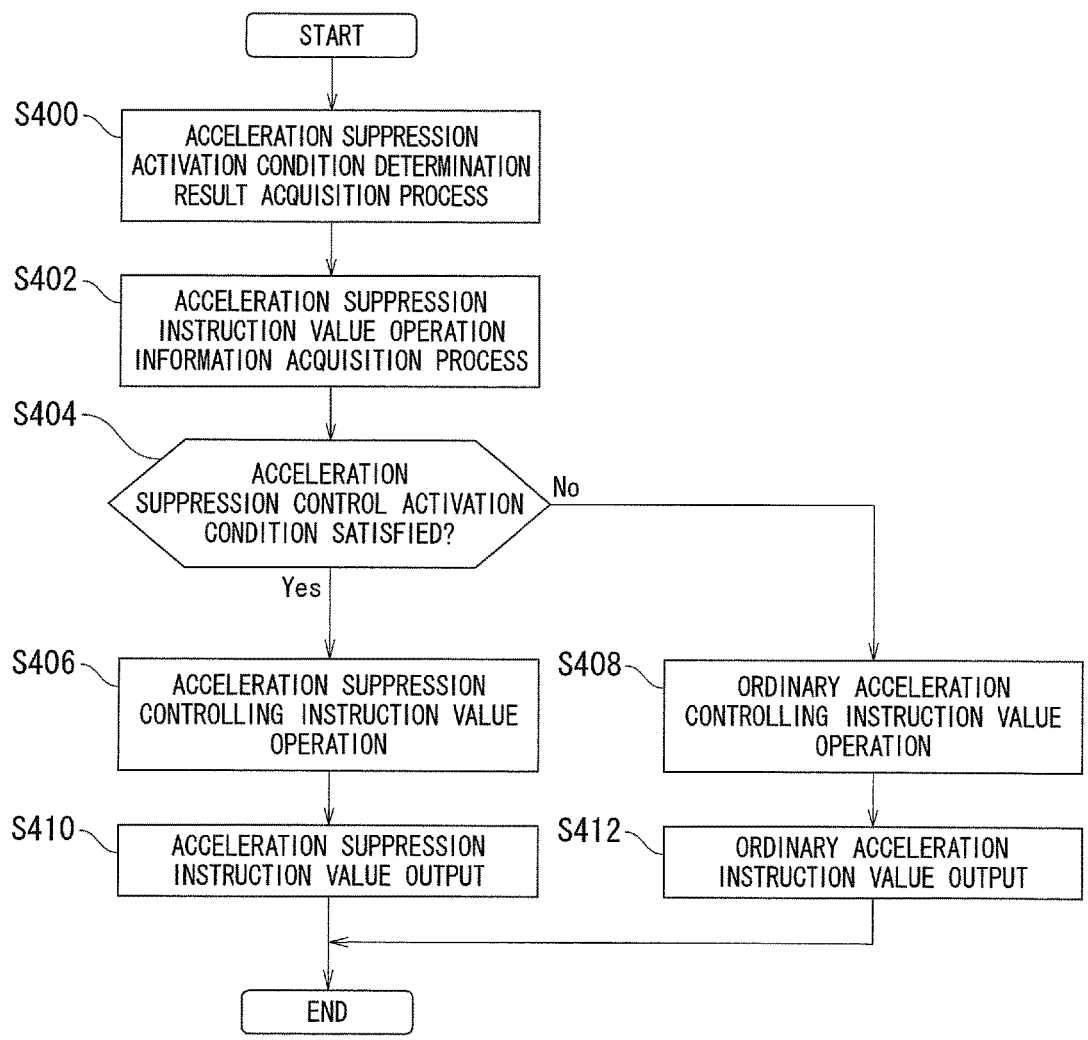
FIG. 18 is a flow chart illustrative of a process to be carried out by an acceleration suppression instruction value operation unit.

Next, referring to FIG. 1 to FIG. 17, by using FIG. 18, a process to be carried out by the acceleration suppression instruction value operation unit 10J will be described. FIG. 18 is a flow chart illustrative of the process to be carried out by the acceleration suppression instruction value operation unit 10J. It is to be noted that the acceleration suppression instruction value operation unit 10J is configured to carry out the process to be described below at every predefined sampling time (for example, 10 msec).

As illustrated in FIG. 18, when the acceleration suppression instruction value operation unit 10J starts the process (START), firstly, in step S400, the acceleration suppression instruction value operation unit 10J is configured to refer to the acceleration suppression activation condition determination result signal which has been received from the acceleration suppression control content operation unit 10I. Then, a process ("acceleration suppression activation condition determination result acquisition process" in the drawing) of acquiring an acceleration suppression activation condition determination result is carried out. When the process of acquiring the acceleration suppression activation condition determination result in step S400 is carried out, the process to be carried out by the acceleration suppression instruction value operation unit 10J goes to step S402.

In step S402, in addition to the acceleration suppression activation condition determination result acquired in step S400, a process ("acceleration suppression instruction value operation information acquisition process" in the drawing) of acquiring information for operating an acceleration suppression instruction value is carried out. In step S402, when the acceleration suppression instruction value operation unit 10J carries out the process of acquiring the information for operating the acceleration suppression instruction value, the process to be carried out by the acceleration suppression instruction value operation unit 10J goes to step S404.

It is to be noted that the information for operating the acceleration suppression instruction value is, for example, information included in the acceleration suppression control start timing signal, the acceleration suppression control amount signal, the drive side pressed amount signal, and the accelerator manipulation speed signal, which have been described above.

In step S404, a process ("acceleration suppression control activation condition satisfied?" in the drawing) of determining whether or not the acceleration suppression activation condition determination result acquired in step S400 is a determination result that satisfies an acceleration suppression control operation condition.

In step S404, when it is the determination result that satisfies an acceleration suppression control activation condition ("Yes" in the drawing), the process to be carried out by the acceleration suppression instruction value operation unit 10J goes to step S406.

On the other hand, when it is the determination result that does not satisfy the acceleration suppression control activation condition ("No" in the drawing) in step S404, the process to be carried out by the acceleration suppression instruction value operation unit 10J goes to step S408.

In step S406, a process ("acceleration suppression controlling instruction value operation" in the drawing) of operating the acceleration suppression instruction value, which is an acceleration instruction value for carrying out the acceleration suppression control is carried out, based on the information for operating the acceleration suppression instruction value acquired in step S402. When the process of operating the acceleration suppression instruction value is carried out in step S406, the process to be carried out by the acceleration suppression instruction value operation unit 10J goes to step S410.

Herein, in the process of operating the acceleration suppression instruction value, the acceleration suppression instruction value operation unit 10J is configured to refer to the pressed amount of the accelerator pedal 32 included in the drive side pressed amount signal and the acceleration suppression control amount included in the acceleration suppression control amount signal. Then, the acceleration suppression instruction value operation unit 10J is configured to operate the acceleration suppression control amount instruction value to suppress the throttle opening degree with respect to the actual opening degree of the accelerator pedal 32 in a suppression level (see FIG. 17) depending on the acceleration suppression control amount.

Further, in the process of operating the acceleration suppression instruction value, the acceleration suppression instruction value operation unit 10J is configured to refer to the pressed amount of the accelerator pedal 32 included in the drive side pressed amount signal and the acceleration suppression control start timing included in the acceleration suppression control start timing signal. Then, the acceleration suppression control start timing instruction value is operated such that the acceleration suppression control start timing is set depending on the actual opening degree of the accelerator pedal 32 (see FIG. 17).

Then, in the process of operating the acceleration suppression instruction value, the instruction value including the acceleration suppression control amount instruction value and the acceleration suppression control start timing instruction value that have been operated as described above, is operated as the acceleration suppression instruction value.

In step S408, a process ("ordinary acceleration controlling instruction value operation" in the drawing) of operating an ordinary acceleration instruction value that is an acceleration instruction value to be used in drive force control that does not perform the acceleration suppression control, that is, the ordinary acceleration control, is carried out. In step S408, when the process of operating the ordinary acceleration instruction value is carried out, the process to be carried out by the acceleration suppression instruction value operation unit 10J goes to step S412.

Herein, in the process of operating the ordinary acceleration instruction value, the instruction value to be operated for the throttle opening degree based on the pressed amount of the accelerator pedal 32 included in the drive side pressed amount signal is operated as an ordinary acceleration instruction value.

In step S410, a process ("acceleration suppression instruction value output" in the drawing) of outputting the acceleration suppression instruction value signal including the acceleration suppression instruction value operated in step S406 to the target throttle opening degree operation unit 10K is carried out. When the process of outputting the acceleration suppression instruction value signal is carried out in step S410, the process to be carried out by the acceleration suppression instruction value operation unit 10J comes to an end (END).

In step S412, a process ("ordinary acceleration instruction value output" in the drawing) of outputting the ordinary acceleration instruction value signal including the ordinary acceleration instruction value operated in step S408 to the target throttle opening degree operation unit 10K is carried out. When the process of outputting the ordinary acceleration instruction value signal is carried out in step S412, the process to be carried out by the acceleration suppression instruction value operation unit 10J comes to an end (END).

(Process to be Carried Out by the Target Throttle Opening Degree Operation Unit 10K)

Figures 19, 20:
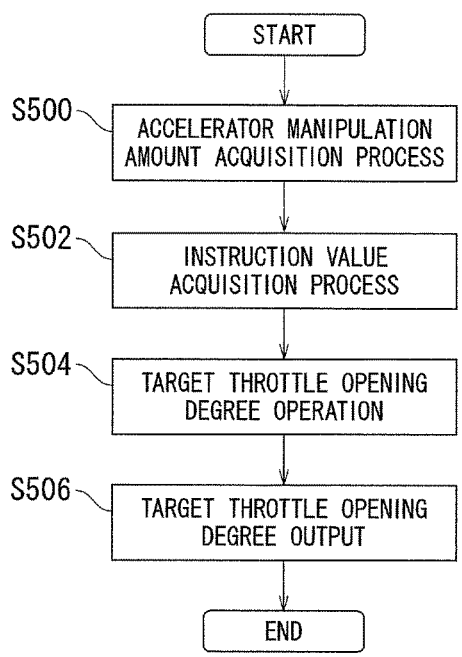
FIG. 19 is a flow chart illustrative of a process to be carried out by a target throttle opening degree operation unit.
FIG. 20 is a view illustrative of a modification in the first embodiment of the present disclosure.

Next, referring to FIG. 1 to FIG. 18, by using FIG. 19, a process to be carried out by the target throttle opening degree operation unit 10K will be described. FIG. 19 is a flow chart illustrative of the process to be carried out by the target throttle opening degree operation unit 10K. It is to be noted that the target throttle opening degree operation unit 10K is configured to carry out the following processing at every predefined sampling time (for example, 10 msec).

As illustrated in FIG. 19, when the target throttle opening degree operation unit 10K starts (START) the process, firstly, in step S500, the target throttle opening degree operation unit 10K is configured to refer to the drive side pressed amount signal which has been received from the accelerator manipulation amount operation unit 10G. Then, a process ("accelerator manipulation amount acquisition process" in the drawing) of acquiring the pressed amount (manipulation amount) of the accelerator pedal 32 included in the drive side pressed amount signal is carried out. When the process of acquiring the pressed amount (manipulation amount) of the accelerator pedal 32 is carried out in step S500, the process to be carried out by the target throttle opening degree operation unit 10K goes to step S502.

In step S502, based on the information signal which has been received from the acceleration suppression instruction value operation unit 10J, a process ("instruction value acquisition process" in the drawing) of acquiring the acceleration suppression instruction value (see step S406) or the ordinary acceleration instruction value (see step S408) is carried out. When the process of acquiring the acceleration suppression instruction value or the ordinary acceleration instruction value is carried out in step S502, the process to be carried out by the target throttle opening degree operation unit 10K goes to step S504.

In step S504, based on the pressed amount of the accelerator pedal 32 acquired in step S500 and the instruction value acquired in step S502, operation ("target throttle opening degree operation" in the drawing) of the target throttle opening degree is carried out. When the target throttle opening degree is operated in step S504, the process to be carried out by the target throttle opening degree operation unit 10K goes to step S506.

In this situation, in step S504, when the instruction value acquired in step S502 is the ordinary acceleration instruction value (when an acceleration suppression activation condition is not satisfied), the throttle opening degrees depending on the pressed amount of the accelerator pedal 32 is operated as the target throttle opening degree.

On the other hand, when the instruction value acquired in step S502 is the acceleration suppression instruction value (when an acceleration suppression activation condition is satisfied), the throttle opening degree depending on the acceleration suppression control amount instruction value is operated as the target throttle opening degree.

For example, the target throttle opening degree is operated by using a following expression (1).

$$\theta^* = \theta 1 - \Delta\theta \quad (1)$$

In the above expression (1), the target throttle opening degree is indicated by "$\theta^*$", the throttle opening degree depending on the pressed amount of the accelerator pedal 32 is indicated by "$\theta 1$", and the acceleration suppression control amount is indicated by "$\Delta\theta$".

In step S506, the target throttle opening degree signal including the target throttle opening degree $\theta^*$ operated in step S504 is output to the engine controller 12 ("target throttle opening degree output" in the drawing). When the process of outputting the target throttle opening degree signal to the engine controller 12 is carried out in step S506, the process to be carried out by the target throttle opening degree operation unit 10K comes to an end (END).

In this situation, in step S506, when the instruction value acquired in step S502 is the acceleration suppression instruction value, at a timing when the opening degree (pressed amount) of the accelerator pedal 32 reaches the opening degree depending on the acceleration suppression control start timing, the target throttle opening degree signal is output.

(Operation)

Next, referring to FIG. 1 to FIG. 19, an example of an operation to be carried out by using the vehicle acceleration suppression device 1 in the present embodiment will be described. In the operation to be described below, an example in which the vehicle V that moves in a parking space enters the parking frame L0 selected by the driver will be described.

In a state where the speed of the vehicle V moving in the parking space is equal to or higher than 15 km/h, which is a vehicle speed threshold, an acceleration suppression control activation condition is not satisfied. Thus, the ordinary acceleration control on which a driver's acceleration intention is reflected is carried out without the acceleration suppression control being activated in the vehicle V.

When the vehicle speed becomes lower than the vehicle speed threshold, the parking frame L0 is detected, the brake pedal 30 is not manipulated, and the pressed amount of the accelerator pedal 32 is equal to or larger than the threshold accelerator manipulation amount, a determination is made on whether or not the vehicle V should enter the parking frame L0.

In addition, while the vehicle V is traveling, the parking frame certainty degree set unit 36 is configured to set the parking frame certainty degree, and the parking frame entering certainty degree set unit 38 is configured to set the parking frame entering certainty degree. Then, the total certainty degree set unit 40 is configured to set the total certainty degree based on the parking frame certainty degree and the parking frame entering certainty degree.

Further, while the vehicle V is traveling, based on the total certainty degree that has been set by the total certainty degree set unit 40, the acceleration suppression control start timing operation unit 42 is configured to operate the acceleration suppression control start timing and the acceleration suppression control amount operation unit 44 is configured to operate the acceleration suppression control amount.

Then, when it is determined that the vehicle V enters the parking frame L0 and it is determined that the acceleration suppression control activation condition is satisfied, the acceleration suppression instruction value operation unit 10J is configured to output the acceleration suppression instruction value signal to the target throttle opening degree operation unit 10K. Furthermore, the target throttle opening degree operation unit 10K is configured to output the target throttle opening degree signal to the engine controller 12.

Accordingly, when a driver manipulates the accelerator pedal 32 in a state where the acceleration suppression control activation condition is satisfied, the throttle opening degree depending on the pressed amount of the accelerator pedal 32 is suppressed to the opening degree depending on the acceleration suppression control amount instruction value. In addition to this, the start timing of suppressing the throttle opening degree depending on the pressed amount of the accelerator pedal 32 is set to the timing depending on the acceleration suppression control start timing instruction value.

Thus, even if the accelerator pedal 32 is operated by an incorrect manipulation in a situation where braking is an appropriate manipulation like the state where the vehicle V moves to be closer to the location where parking is suitable in the parking frame L0, or the like, it is possible to suppress the throttle opening degree depending on the total certainty degree. In other words, in a state where the total certainty degree is low, the acceleration suppression amount (the suppression degree of the throttle opening degree) is small. Hence, the degradation in the drive performance can be reduced. In a state where the total certainty degree is high, the acceleration suppression amount is large. Hence, the acceleration suppression effect of the vehicle V can be improved.

As described above, in the present embodiment, it is possible to suppress a degradation in the drive performance in the parking space before entering the parking frame L0 at the time of parking. In addition, it is possible to suppress acceleration of the vehicle V in the incorrect manipulation of the accelerator pedal 32.

Also, in the present embodiment, as the total certainty degree is higher, the acceleration suppression control amount is increased, so that the acceleration of the vehicle V is suppressed and the safety is improved. Also, as the total certainty degree is lower, the acceleration suppression control start timing is delayed, so as to suppress the degradation in the drive performance. Accordingly, in a situation to be described below, the improvement in the safety and the suppression of the degradation in the drive performance are enabled.

For example, on a road, in a situation where the vehicle V that is waiting near an indication of the parking frame L0 for parallel parking beside the travel road, a certain level of acceleration needs to be permitted.

Also, in the situation to be described below, a certain level of acceleration needs to be permitted. Specifically, other vehicles are existing on both sides (parking frames on the left and right) of the parking frame L0 where the vehicle V is to be parked, and the vehicle V is made to enter some space on the opposite side (apart from each parking frame) from the front side of the vehicle V. Then, the vehicle V is made to enter the parking frame L0 where the vehicle V is to be parked from the rear side of the vehicle V.

By controlling the acceleration suppression control start timing and the acceleration suppression control amount based on the total certainty degree in these situations, the acceleration of the vehicle V is suppressed to enable an improvement in the safety. In addition to this, the acceleration of the vehicle V is permitted to suppress a degradation in the drive performance.

Furthermore, in the present embodiment, when a predefined condition is satisfied in the situation where plural possible parking frames are detected, as to each of the parking frame certainty degree and the parking frame entering certainty degree, one of the certainty degrees is corrected for increase based on the other of the certainty degrees. Therefore, even if a low parking frame certainty degree or a low parking frame entering certainty degree is included for each parking frame, it can be determined that there is a high possibility on the whole that there are plural parking frames and the vehicle is to be parked in any one of the parking frames. Therefore, the possibility of setting the total certainty degree to be a more appropriate state is increased, and the determination of starting the acceleration suppression control can be carried out more properly.

It is to be noted that the acceleration suppression instruction value operation unit 10J and the target throttle opening degree operation unit 10K correspond to an acceleration controller.

In addition, the surrounding environment recognition information operation unit 10A corresponds to a surrounding environment recognition unit. Further, the vehicle speed operation unit 10B, the steering angle operation unit 10C, the steering angle speed operation unit 10D, the brake pedal manipulation information operation unit 10F, the accelerator manipulation amount operation unit 10G, and the accelerator manipulation speed operation unit 10H correspond to a vehicle travel state detector.

Furthermore, the acceleration suppression activation condition determination unit 34 corresponds to a parking frame entering manipulation detector.

Moreover, the acceleration suppression control start timing operation unit 42, the acceleration suppression control amount operation unit 44, the acceleration suppression instruction value operation unit 10J, and the target throttle opening degree operation unit 10K correspond to an acceleration suppression unit. Also, the throttle opening degree corresponds to an acceleration instruction value.

In addition, the navigation device 26 corresponds to a vehicle current location detector and a vehicle travel road type detector. Further, as described above, in a vehicle acceleration suppression method to be carried out by the operation of the vehicle acceleration suppression device 1 in the present embodiment, as the parking frame certainty degree is higher, the acceleration instruction value depending on a manipulation amount of the accelerator pedal 32 is suppressed by a higher suppression degree. Herein, the parking frame certainty degree means the degree of certainty where there is the parking frame L0 in the travel direction of the vehicle V, and is set based on the surrounding environment of the vehicle V.

Furthermore, as described above, in the vehicle acceleration suppression method to be carried out by the operation of the vehicle acceleration suppression device 1 in the present embodiment, as the total certainty degree is higher, the acceleration instruction value depending on a manipulation amount of the accelerator pedal 32 is suppressed by a higher suppression degree. Here, the total certainty degree means the degree of the total certainty of the parking frame certainty degree and the parking frame entering certainty degree. Moreover, the parking frame entering certainty degree means the degree of the certainty where the vehicle V enters the parking frame L0.

Effects in the First Embodiment

According to the present embodiment, following effects to be described below will be brought out.

(1) The parking frame certainty degree set unit 36 is configured to set the parking frame certainty degree based on the bird's-eye view image (environment) of surroundings of the vehicle V and the speed (travel state) of the vehicle V. In addition to this, the acceleration suppression control start timing operation unit 42, the acceleration suppression control amount operation unit 44, the acceleration suppression instruction value operation unit 10J, and the target throttle opening degree operation unit 10K are configured to increase the suppression degree of the acceleration instruction value, as the parking frame certainty degree that has been set by the parking frame certainty degree set unit 36 is higher. In other words, the acceleration suppression control start timing operation unit 42, the acceleration suppression control amount operation unit 44, the acceleration suppression instruction value operation unit 10J, and the target throttle opening degree operation unit 10K are configured to reduce the suppression degree of the acceleration instruction value, as the parking frame certainty degree that has been set by the parking frame certainty degree set unit 36 is lower. Accordingly, in the state where the parking frame certainty degree is low, the suppression degree of the acceleration instruction value is reduced so that the degradation in the drive performance can be reduced, whereas in the state where the parking frame certainty degree is high, the suppression degree of the acceleration instruction value is increased so that the acceleration suppression effect can be improved. As a result, a degradation in the drive performance of the vehicle V at the time of parking is suppressed, and the acceleration of the vehicle V in the incorrect manipulation of the accelerator pedal 32 can be also suppressed.

(2) The parking frame entering certainty degree set unit 38 is configured to set the parking frame entering certainty degree based on the bird's-eye view image (environment) of surroundings of the vehicle V, the speed of the vehicle V, and a rotation angle (travel state) of the steering wheel 28. In addition to this, the total certainty degree set unit 40 is configured to set the total certainty degree based on the parking frame certainty degree that has been set by the parking frame certainty degree set unit 36 and the parking frame entering certainty degree that has been set by the parking frame entering certainty degree set unit 38. Furthermore, the acceleration suppression control start timing operation unit 42, the acceleration suppression control amount operation unit 44, the acceleration suppression instruction value operation unit 10J, and the target throttle opening degree operation unit 10K are configured to increase the suppression degree of the acceleration instruction value, as the total certainty degree that has been set by the total certainty degree set unit 40 is higher. Accordingly, the suppression degree of the acceleration instruction value can be controlled depending on the degree of the certainty that there is a parking frame L0 in the travel direction of the vehicle V and the degree of the certainty that the vehicle V enters the parking frame L0. As a result, in addition to the above-described effect (1), a degradation in the drive performance of the vehicle V at the time of parking is suppressed, and the acceleration of the vehicle V in the incorrect manipulation of the accelerator pedal 32 can be also suppressed.

(3) The acceleration suppression control start timing operation unit 42, the acceleration suppression instruction value operation unit 10J, and the target throttle opening degree operation unit 10K are configured to shorten the acceleration suppression control start timing to increase the suppression degree of the acceleration instruction value. As a result, the start timing of suppressing the throttle opening degree depending on the pressed amount of the accelerator pedal 32 is controlled, so that the suppression degree of the acceleration instruction value can be controlled.

(4) The acceleration suppression control amount operation unit 44, the acceleration suppression instruction value operation unit 10J, and the target throttle opening degree operation unit 10K are configured to increase the acceleration suppression control amount to increase the suppression degree of the acceleration instruction value. As a result, the suppression amount of the throttle opening degree depending on the pressed amount of the accelerator pedal 32 is controlled, so that the suppression degree of the acceleration instruction value can be controlled.

(5) According to the vehicle acceleration suppression method in the present embodiment, the parking frame certainty degree is set based on the bird's-eye view image (environment) of surroundings of the vehicle V and the speed (travel state) of the vehicle V. In addition to this, when entering of the vehicle V into the parking frame L0 is detected, the suppression degree of the acceleration instruction value is increased, as the parking frame certainty degree is higher. Accordingly, when the parking frame certainty degree is in a low state, the suppression degree of the acceleration instruction value is lowered, so that the degradation in the drive performance can be reduced, whereas when the parking frame certainty degree is in a high state, the suppression degree of the acceleration instruction value is increased, so that the acceleration suppression effect of the vehicle V can be improved. As a result, a degradation in the drive performance of the vehicle V at the time of parking is suppressed, and the acceleration of the vehicle V in the incorrect manipulation of the accelerator pedal 32 can be also suppressed.

(6) According to the vehicle acceleration suppression method in the present embodiment, the parking frame entering certainty degree is set based on the bird's-eye view image (environment) of surroundings of the vehicle V and the speed (travel state) of the vehicle V. In addition to this, the total certainty degree is set based on the parking frame certainty degree and the parking frame entering certainty degree, which have been set. The suppression degree of the acceleration instruction value is increased, as the total certainty degree is higher. Hence, the suppression degree of the acceleration instruction value can be controlled depending on the degree of the certainty that there is a parking frame L0 in the travel direction of the vehicle V and the degree of the certainty that the vehicle V enters the parking frame L0. As a result, in addition to the above-described effect (5), a degradation in the drive performance of the vehicle V at the time of parking can be suppressed, and the acceleration of the vehicle V in the incorrect manipulation of the accelerator pedal 32 can be also suppressed.

(7) The parking frame certainty degree set unit 36 and the parking frame entering certainty degree set unit 38 are configured to correct one of the parking frame certainty degrees based on another one of the parking frame certainty degrees, when plural possible parking frames are detected. Thus, the certainty degrees can be set properly. Therefore, detection accuracy of the parking frame demanded for determining the need of the acceleration suppression control can be improved. In other words, in the situation where plural possible parking frames are detected, one of the parking frame certainty degrees is corrected based on another one of the parking frame certainty degrees. Even if each of the parking frame certainty degrees is low, the parking frame certainty degrees can be increased in a reasonable range by mutually complementing, and the situation of demanding the acceleration suppression control can be determined with higher accuracy.

(8) The parking frame certainty degree set unit 36 and the parking frame entering certainty degree set unit 38 are configured to make a correction, only when the vehicle is in the turning travel state. Hence, the parking frame can be corrected as necessary.

(9) The parking frame certainty degree set unit 36 is configured to correct a lower parking frame certainty degree to be higher depending on a higher parking frame certainty degree. Thus, the certainty degree can be set easily and more properly.

(10) When the parking frame certainty degree set unit 36 is capable of estimating that the plural possible parking frames that have been detected share a single parking frame line, one of the parking frame certainty degrees is corrected based on the other one of the parking frame certainty degrees. The timing for correcting the parking frame is determined more properly and the correction can be made, accordingly.

(11) When one of the parking frame certain degrees is higher than another one of the parking frame certain degrees and is higher by a predefined stage (level 1) of several stages, the parking frame certainty degree set unit 36 is configured to add a part of the one of the parking frame certain degrees to another one of the parking frame certain degrees. Hence, the certainty degree can be set easily and more properly.

(12) When plural possible parking frames are detected, the parking frame entering certainty degree set unit 38 is configured to conform the plural parking frame entering certain degrees to a highest one of the certainty degrees. Hence, the parking frame entering certainty degree can be set easily and more properly.

Modifications (1) In the present embodiment, the acceleration suppression control start timing and the acceleration suppression control amount are operated based on the total certainty degree that has been set by the total certainty degree set unit 40. However, the present disclosure is not limited to this. In other words, the acceleration suppression control start timing and the acceleration suppression control amount may be operated only based on the parking frame certainty degree that has been set by the parking frame certainty degree set unit 36. In this case, for example, the acceleration suppression control start timing and the acceleration suppression control amount are operated by applying the parking frame certainty degree on an acceleration suppression condition operation map illustrated in FIG. 20. It is to be noted that FIG. 20 is a view illustrative of a modification in the present embodiment.

(2) In the present embodiment, the parking frame certainty degree set unit 36 is configured to set the parking frame certainty degree based on the bird's-eye view image (environment) of surroundings of the vehicle V and the speed (travel state) of the vehicle V. However, the configuration of the parking frame certainty degree set unit 36 is not limited to this. In other words, the parking frame certainty degree set unit 36 may be configured to set the parking frame certainty degree by using not only the bird's-eye view image of surroundings of the vehicle V and the vehicle speed but also a current location of the vehicle V included in the vehicle location signal and the type of road (road type) on which the vehicle V travels included in a travel road information signal. In this case, for example, when it is detected that the current location of the vehicle V travels on a public road based on the information included in the vehicle location signal and the travel road information signal, it is determined that there is no parking frame L0 around the vehicle V, and the parking frame certainty degree is set to "level 0". Accordingly, for example, when the vehicle V moves into the parking frame in which the operation of the acceleration suppression control is not desirable, such as a parking frame arranged at a road end of a public road, a degradation in the drive performance of the vehicle V can be suppressed.

(3) In the present embodiment, when determining that the end points of the lines La and Lb are opposed to each other in the width WL direction, the parking frame certainty degree set unit 36 is configured to set the parking frame certainty degree to the level 3 or the level 4 (see step S212). However, the process of setting the parking frame certainty degree to the level 3 or level 4 is not limited to this. In other words, the end point of the line L has a shape that is not indicated on a public road, for example, such as a letter U shape (see FIG. 4G to FIG. 4K, FIG. 4M, and FIG. 4N), the parking frame certainty degree may be set to the level 3 or the level 4.

(4) In the present embodiment, the parking frame certainty degree set unit 36 is configured to set the parking frame certainty degree based on the bird's-eye view image (environment) of surroundings of the vehicle V and the speed (travel state) of the vehicle V. However, the configuration of the parking frame certainty degree set unit 36 is not limited to this. In other words, when the vehicle V is configured to include a device (parking assist device) for assisting a driver operating the steering operation to the parking frame L0, and the parking assist device is in an on state, the level of the parking frame certainty degree may be easily increased. In this situation, the configuration in which the level of the parking frame certainty degree is easily increased is a configuration in which the above-described moving distance is set to shorter than usual.

(5) In the present embodiment, the acceleration suppression control amount and the acceleration suppression control start timing are changed based on the total certainty degree so as to change the suppression degree of the acceleration instruction value. However, the present embodiment is not limited to this. In other words, depending on the total certainty degree, only the acceleration suppression control start timing or only the acceleration suppression control amount may be changed so as to change the suppression degree of the acceleration instruction value. In this case, for example, as the total certainty degree is higher, the acceleration suppression control amount may be set to be larger, so that the suppression degree of the acceleration instruction value may be increased without changing the acceleration suppression control start timing.

(6) In the present embodiment, when plural possible parking frames are detected, both of the parking frame certainty degree and the parking frame entering certainty degree are corrected. However, the present embodiment is not limited to this. The correction process may be carried out only for the parking frame certainty degree, whereas the parking frame entering certainty degree may keep the originally set value without change.

(7) In the present embodiment, the acceleration instruction value is controlled, so that the acceleration of the vehicle V depending on the pressed amount (drive power manipulation amount) of the accelerator pedal 32 is suppressed. However, the present embodiment is not limited to this. In other words, for example, the throttle opening degree depending on the pressed amount (drive power manipulation amount) of the accelerator pedal 32 may be set to a target throttle opening degree, and in addition, a brake force may be generated by the above-described brake device so that the acceleration of the vehicle V depending on the drive power manipulation amount may be suppressed.

(8) In the present embodiment, the parking frame certainty degree is calculated as the level 0 that is a minimum value and several stages of level (levels 1 to 4) higher than the minimum value. However, the stages of the parking frame certainty degree are not limited to them. In other words, the parking frame certainty degree may be calculated as only two stages, including one level (for example, "level 0") that is the minimum value and the other level (for example, "level 0") that is higher than the minimum value.

(9) In the present embodiment, the parking frame entering certainty degree is calculated as the "level 0" that is the minimum value, the "low level" that is higher than the level 0, or the "high level" that is higher than the low level. However, the stage of the parking frame entering certainty degree is not limited to this. In other words, the parking frame entering certainty degree, may be calculated on only two steps with the level (for example, "level 0") that is the minimum value and the other level (for example, "level 100") that is higher than the minimum value.

(10) In the present embodiment, the total certainty degree is calculated as any one of four stages of level ("extremely low", "low", "high", and "extremely high") depending on the parking frame certainty degree that has been calculated as any one of five stages of level and the parking frame entering certainty degree that has been calculated as any one of three stages of level. However, the stage of the total certainty degree is not limited to this. In other words, the total certainty degree may be calculated as only two stages of level including one level (for example, "level 0") that is the minimum value and the other level (for example, "level 100") that is higher than the minimum value. In this case, when the parking frame certainty degree and the parking frame entering certainty degree are calculated as the level that is the minimum value, for example, the total certainty degree is calculated as the level that is the minimum value. In addition, for example, when the parking frame certainty degree and the parking frame entering certainty degree are calculated as the level that is higher than the minimum value, the total certainty degree may be calculated as the level that is higher than the minimum value.

Herein, while a limited number of embodiments have been described with illustration, it should be apparent that the present disclosure is not limited to them and modifications and adaptations to each of the embodiments based on the above disclosure may occur to one skilled in the art.

The invention claimed is:

1. A vehicle acceleration suppression device, comprising:
   a drive force manipulation amount detector configured to detect a drive force manipulation amount that is a manipulation amount of a drive force instruction manipulation element manipulated by a driver to instruct a drive force;
   an acceleration controller configured to control acceleration of a vehicle depending on the drive force manipulation amount detected by the drive force manipulation amount detector;
   a surrounding environment recognition unit configured to recognize an environment surrounding the vehicle based on detection information of a surrounding environment recognition sensor provided in the vehicle;
   a parking frame certainty degree set unit configured to set a respective parking frame certainty degree indicative of a respective degree of certainty for each detected possible parking frame in a travel direction of the vehicle based on the environment recognized by the surrounding environment recognition unit; and
   an acceleration suppression unit configured to suppress the acceleration to be controlled by the acceleration controller such that a suppression degree of the acceleration is positively correlated to a parking frame certainty degree of a detected possible parking frame, based on the parking frame certainty degree set by the parking frame certainty degree set unit,
      wherein the drive force is controlled for suppression by suppressing the acceleration of the vehicle which depends on the manipulation amount of the drive force instruction manipulation element, the suppressing of the acceleration is based on the suppression degree of the acceleration, and
      wherein, upon conditions that at least a first possible parking frame and a second possible parking frame are detected, with the first possible parking frame and the second possible parking frame sharing a parking frame line, and a first parking frame certainty degree of the first possible parking frame is lower than a second parking frame certainty degree of the second possible parking frame, the parking frame certainty degree set unit is configured to increase the first parking frame certainty degree based on the second parking frame certainty degree.

2. The vehicle acceleration suppression device according to claim 1, wherein the parking frame certainty degree set unit is configured to correct the first parking frame certainty degree when the vehicle is in a turning travel state.

3. The vehicle acceleration suppression device according to claim 2, wherein the parking frame certainty degree set unit is configured not to correct the first parking frame certainty degree when the vehicle is in a straight travel state.

4. The vehicle acceleration suppression device according to claim 1, wherein the parking frame certainty degree set unit is configured to increase the first parking frame certainty degree based on the second parking frame certainty degree by setting the first parking frame certainty degree to the second parking frame certainty degree.

5. The vehicle acceleration suppression device according to claim 1, further comprising:
   a vehicle travel state detector configured to detect a travel state of the vehicle;
   a parking frame entering certainty degree set unit configured to set a respective parking frame entering certainty degree indicative of a respective degree of certainty that the vehicle enters a respective parking frame for the each detected possible parking frame based on the environment recognized by the surrounding environment recognition unit and the travel state detected by the vehicle travel state detector; and
   a total certainty degree set unit configured to set a respective total certainty degree indicative of a respective total degree of the certainty of the respective parking frame certainty degree and the respective parking frame entering certainty degree based on the respective parking frame certainty degree set by the parking frame certainty degree set unit and the respective parking frame entering certainty degree set by the parking frame entering certainty degree set unit,
      wherein the acceleration suppression unit is configured to increase the suppression degree of the acceleration to be controlled by the acceleration controller, as the total certainty degree set by the total certainty degree set unit increases, and
      wherein, upon condition that at least the first possible parking frame and the second possible parking frame are detected, the parking frame entering certainty degree set unit is configured to correct a first parking frame entering certainty degree of the first possible parking frame based on a second parking frame entering certainty degree of the second possible parking frame.

6. The vehicle acceleration suppression device according to claim 5, wherein the parking frame entering certainty degree set unit is configured to set the first parking frame entering certainty degree to a highest parking frame entering certainty degree of the respective parking frame entering certainty degree of the each detected possible parking frame.

7. The vehicle acceleration suppression device according to claim 6, wherein the parking frame entering certainty degree set unit is configured to correct the first parking frame entering certainty degree when the vehicle is in a turning travel state, and the parking frame entering certainty degree set unit is configured not to correct the first parking frame certainty degree when the vehicle is in a straight travel state.

8. A vehicle acceleration suppression method, comprising:
- detecting a drive force manipulation amount that is a manipulation amount of a drive force instruction manipulation element manipulated by a driver to instruct a drive force;
- recognizing an environment surrounding the vehicle;
- setting a respective parking frame certainty degree for each one of a plurality of possible parking frames detected based on the environment that has been recognized, the respective parking certainty degree being indicative of a degree of certainty that the respective possible parking frame exists in a travel direction of the vehicle; and
- suppressing acceleration such that a suppression degree of the acceleration which depends on the drive force manipulation amount that has been detected is increased, as the parking frame certainty degree is higher;
- upon condition that a first possible parking frame and a second possible parking frames are detected and the first possible parking frame and the second possible parking frame share a parking frame line, correcting, by increasing, a first parking frame certainty degree based on a higher second parking frame certainty degree,
- wherein the drive force is controlled for suppression by suppressing the acceleration of the vehicle which depends on the manipulation amount of the drive force instruction manipulation element.

9. The vehicle acceleration suppression method according to claim 8, further comprising:
- detecting a travel state of the vehicle;
- setting a parking frame entering certainty degree indicative of a degree of certainty that the vehicle enters the parking frame for the possible parking frame based on the environment that has been recognized and the travel state that has been detected;
- setting a total certainty degree indicative of a total degree of the certainty of the parking frame certainty degree and the parking frame entering certainty degree based on the parking frame certainty degree that has been set and the parking frame entering certainty degree that has been set;
- increasing the suppression degree of the acceleration to be controlled depending on the drive force manipulation amount that has been detected, as the total certainty degree increases; and
- correcting the first parking frame entering certainty degree based on the second parking frame entering certainty degree, when the plurality of possible parking frames are detected.

* * * * *